US011946285B2

(12) United States Patent
Romero

(10) Patent No.: US 11,946,285 B2
(45) Date of Patent: Apr. 2, 2024

(54) DEAD LOCKING LATCH ASSEMBLY

(71) Applicant: ASSA ABLOY Americas Residential Inc., New Haven, CT (US)

(72) Inventor: Oscar Romero, Lake Forest, CA (US)

(73) Assignee: ASSA ABLOY Americas Residential Inc., New Haven, CT (US)

(*) Notice: Subject to any disclaimer, the term of this patent is extended or adjusted under 35 U.S.C. 154(b) by 68 days.

(21) Appl. No.: 17/572,449

(22) Filed: Jan. 10, 2022

(65) Prior Publication Data

US 2022/0205275 A1 Jun. 30, 2022

Related U.S. Application Data

(63) Continuation of application No. 15/973,746, filed on May 8, 2018, now Pat. No. 11,220,839.

(Continued)

(51) Int. Cl.

*E05B 17/20* (2006.01)
*E05B 55/00* (2006.01)

(Continued)

(52) U.S. Cl.

CPC ...... *E05B 17/2007* (2013.01); *E05B 17/2038* (2013.01); *E05B 55/00* (2013.01); *E05B 63/22* (2013.01); *E05C 5/00* (2013.01)

(58) Field of Classification Search

CPC ............. Y10T 292/06; Y10T 292/1043; Y10T 292/1075; Y10T 292/1083; Y10T 292/1051; Y10T 292/1052; Y10T 292/1061; Y10T 292/1089; Y10T 292/096; Y10T 292/0969; Y10T 292/0863; Y10T 292/0864; Y10T 292/0868; Y10T 292/0886; Y10T 292/0887; E05B 17/2007;

(Continued)

(56) References Cited

U.S. PATENT DOCUMENTS 1,252,454 A * 1/1918 Beau ........................ E05B 85/22 70/DIG. 64
1,855,089 A * 4/1932 Boothe ...................... E05C 1/16 70/483

(Continued)

FOREIGN PATENT DOCUMENTS

CH 383816 A * 4/1961 ............. E05C 19/02
CN 101784737 A * 7/2010 ............. E05C 19/02

(Continued)

*Primary Examiner* — Victor D Batson
*Assistant Examiner* — Steven A Tullia
(74) *Attorney, Agent, or Firm* — Merchant & Gould P.C.

(57) ABSTRACT

A latch assembly is provided where the latch is moveable to open and close a door by operation of a dead lock assembly that blocks or unblocks movement of a bolt. In a blocked state, a blocking cartridge of the dead lock assembly is prevented from inward movement, blocking inward movement of the bolt. Turning a door knob or door handle causes a spindle extending through the dead lock assembly to move locking bars of the dead locking assembly, the locking bars moving further apart to permit the blocking cartridge to slide there between and move inwardly into the latch housing. The bolt can now move inward by force of the doorjamb upon the bolt in order to clear the doorjamb when opening and closing the door.

21 Claims, 31 Drawing Sheets

Related U.S. Application Data

(60) Provisional application No. 62/506,232, filed on May 15, 2017.

(51) Int. Cl.
*E05B 63/22* (2006.01)
*E05C 5/00* (2006.01)

(58) Field of Classification Search
CPC ...... E05B 17/2038; E05B 63/22; E05B 55/00; E05C 5/00
See application file for complete search history.

(56) References Cited

U.S. PATENT DOCUMENTS

| | | | | | |
|---|---|---|---|---|---|
| 2,726,890 | A | * | 12/1955 | Teetor | E05C 3/162 292/64 |
| 2,753,201 | A | | 7/1956 | Teetor | |
| 2,776,155 | A | | 1/1957 | Gerlach | |
| 3,112,944 | A | | 12/1963 | Adler | |
| 3,144,266 | A | * | 8/1964 | Schmid | E05B 55/005 70/151 R |
| 3,206,954 | A | | 9/1965 | Snyman | |
| 3,799,591 | A | * | 3/1974 | Taniyama | E05C 19/02 292/64 |
| 4,135,746 | A | | 1/1979 | Sterling | |
| 4,318,558 | A | * | 3/1982 | Best | E05B 55/12 292/173 |
| 4,902,053 | A | * | 2/1990 | Hakkarainen | E05B 47/0607 292/144 |
| 4,974,884 | A | | 12/1990 | Dietrich | |
| 4,979,768 | A | | 12/1990 | Marotto et al. | |
| 5,020,837 | A | | 6/1991 | Lin | |
| 5,113,676 | A | * | 5/1992 | Panossian | E05B 55/12 70/462 |
| 6,007,115 | A | | 12/1999 | Roth | |
| 6,247,342 | B1 | * | 6/2001 | Lilas | E05C 9/041 292/170 |
| 8,474,884 | B2 | * | 7/2013 | Helisten | E05B 15/102 292/137 |
| 8,671,724 | B2 | * | 3/2014 | Uyeda | E05B 55/00 70/108 |
| 8,690,203 | B1 | * | 4/2014 | Hickman | E05B 55/12 292/169.15 |
| 11,220,839 | B2 | | 1/2022 | Romero | |
| 2004/0232705 | A1 | * | 11/2004 | Hahn | E05C 1/16 292/169 |
| 2006/0196236 | A1 | | 9/2006 | Gruenendahl | |
| 2010/0109349 | A1 | | 5/2010 | Peabody et al. | |
| 2014/0265357 | A1 | * | 9/2014 | Romero | E05B 63/00 292/140 |
| 2015/0330100 | A1 | * | 11/2015 | Helisten | E05B 15/108 292/157 |
| 2016/0123049 | A1 | * | 5/2016 | Kankkunen | E05B 17/0025 292/195 |
| 2017/0275926 | A1 | * | 9/2017 | Kumar | E05B 55/12 |
| 2020/0265662 | A1 | * | 8/2020 | Maiga | G07C 9/00174 |
| 2022/0205275 | A1 | * | 6/2022 | Romero | E05B 55/00 |

FOREIGN PATENT DOCUMENTS

| | | | | | |
|---|---|---|---|---|---|
| DE | 2554411 | A1 | * | 12/1975 | E05B 57/00 |
| DE | 102013206694 | A1 | * | 10/2014 | E05B 47/0607 |
| DE | 102016207939 | A1 | * | 11/2017 | E05B 55/00 |
| EP | 0799956 | A2 | | 10/1997 | |
| EP | 1462592 | A2 | * | 9/2004 | E05B 55/00 |
| EP | 1291478 | B1 | * | 7/2006 | E05B 15/102 |
| EP | 2405085 | A2 | * | 1/2012 | E05B 63/0017 |
| EP | 2975202 | A1 | | 1/2016 | |
| EP | 2975202 | A1 | * | 1/2016 | E05B 55/00 |
| ES | 2269630 | T3 | * | 4/2007 | E05B 15/102 |
| JP | 2007186919 | A | * | 7/2007 | E05C 1/14 |
| JP | 4167741 | B2 | * | 10/2008 | E05B 55/00 |
| KR | 19990040463 | A | * | 6/1996 | E05B 13/105 |
| KR | 100250911 | B1 | * | 11/1997 | E05B 17/2007 |
| KR | 200424013 | Y1 | | 8/2006 | |
| KR | 20140016751 | A | * | 7/2012 | E05B 63/0017 |
| KR | 101598958 | B1 | * | 1/2015 | E05B 15/10 |
| KR | 101695847 | B1 | * | 7/2015 | E05B 63/08 |
| WO | 2009/096892 | A1 | | 8/2009 | |
| WO | 2017/039116 | A1 | | 3/2017 | |
| WO | WO-2017039116 | A1 | * | 3/2017 | E05B 13/105 |

* cited by examiner

DEAD LOCKING LATCH ASSEMBLY

CROSS REFERENCE TO RELATED APPLICATIONS

This application is a continuation of U.S. patent application Ser. No. 15/973,746, filed May 8, 2018, now U.S. Pat. No. 11,220,839; which claims priority from U.S. Provisional Patent Application No. 62/506,232, filed on May 15, 2017, the disclosures of which are hereby incorporated by reference in their entireties.

TECHNICAL FIELD

This disclosure relates generally to latch assemblies; in particular, this disclosure relates to dead locking latch assemblies for selectively holding residential and/or commercial doors in a closed and/or locked position.

BACKGROUND

A latch assembly is used for maintaining a door in a closed position using a bolt that moves between extended and retracted positions. In existing latches, the bolt is actively pushed and pulled between its extended and retracted positions. A dead locking latch is an elaboration of a latch bolt which includes an auxiliary bolt that prevents undesired shimming or jimmying of the latch bolt. For example, when a door is closed, the latch bolt and auxiliary bolt are retracted together. The door closes normally, with the latch bolt entering a strike box and extending into a projected position in the strike box; however, a strike plate surrounding the strike box holds the auxiliary bolt in a depressed position.

A mechanism within the latch assembly retains the latch bolt in the projected position. Because the auxiliary bolt is retained in a depressed position, the latch assembly prevents the latch bolt from being depressed through use of a credit card or some other tool, which could lead to unauthorized entry through the door.

A challenge with existing dead locking latch assemblies is that incorporation of the auxiliary bolt, or the assembly to operate the auxiliary bolt (or the dead latching function), requires additional components that must be manufactured and assembled into the latch assembly and properly aligned with other components within the latch assembly. This increases the cost and complexity of a latch assembly.

Similarly, another challenge is that the dead locking latch assembly includes more components that are susceptible to malfunction. Another challenge with existing latches is adjustability. The more complex a latch assembly is, the more likely it will be limited in adjustability for installation in various doors or entryways.

SUMMARY OF INVENTION

According to the present disclosure, assemblies, components and methodologies are provided for providing a dead locking feature for a latch assembly without having an auxiliary bolt. In illustrative embodiments, a latch assembly is provided with a housing and a bolt movable between an extended position with the bolt extending out of the housing and a retracted position in which the bolt moves and/or pivots inside the housing.

A dead locking assembly is configured within the housing and includes a blocking cartridge coupled to the bolt and a locking bar assembly that is configured to block or unblock movement of the blocking cartridge along a longitudinal axis of the housing, thereby blocking or unblocking movement of the bolt from the extended position to the retracted position. The locking bar assembly includes one or more locking bars that are movable by rotation of a handle of the latch assembly from a first position that abuts against the blocking cartridge to prevent movement and a second position that permits movement of the blocking cartridge within the locking bar assembly.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The present disclosure will be described hereafter with reference to the attached drawings which are given as non-limiting examples only, in which.

DETAILED DESCRIPTION OF THE DRAWINGS

The disclosure generally relates to a latch assembly 10. The latch assembly 10 is disclosed in one embodiment as part of a door knob or door handle assembly 100. The latch assembly 10 as disclosed includes a dead lock function that prevents the latch assembly 10 from being opened via jimmying or unauthorized inward force upon a bolt of the latch assembly 10. Rather, the latch assembly 10 can only be opened by rotation of a door handle that will unblock a dead locking assembly within the latch assembly 10, thereby allowing the bolt to rotate freely upon force on the bolt from a strike plate of a door frame upon opening of the door.

Figure 1:
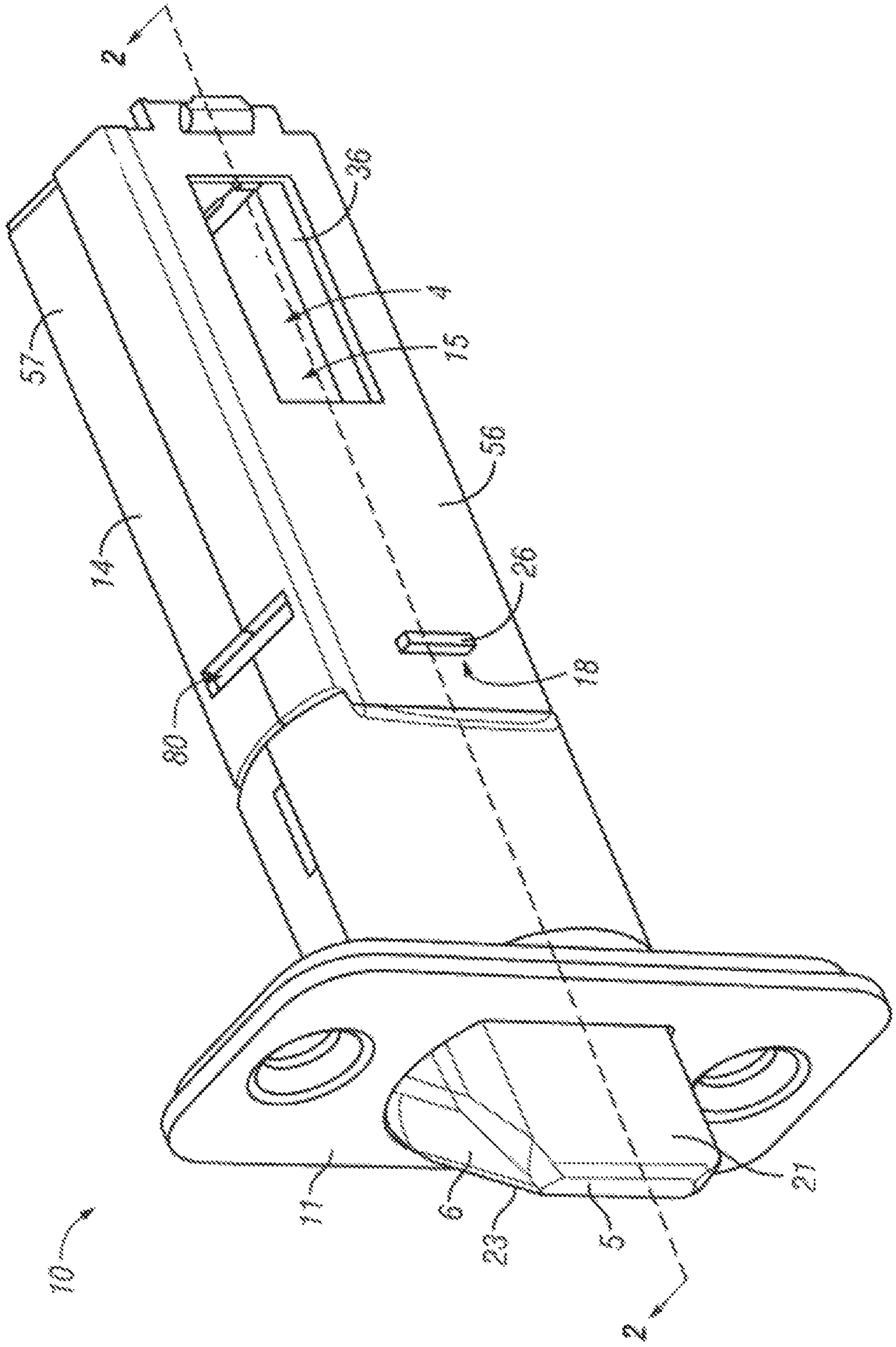
FIG. 1 is a side perspective view of a latch assembly according to an embodiment of the disclosure.
Figure 10:
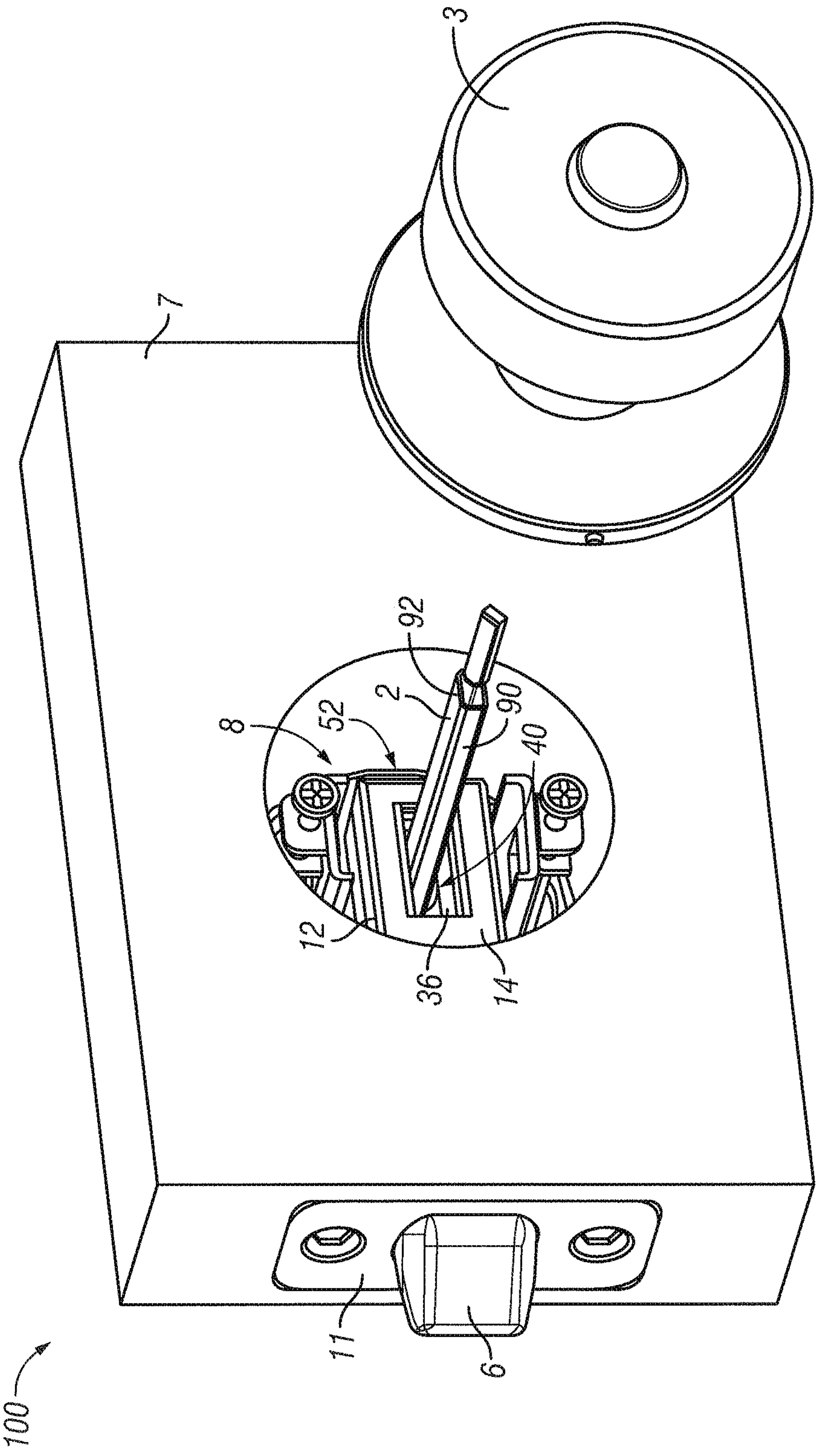
FIG. 10 is a partially exploded perspective view of a door knob assembly including the latch assembly of FIG. 1, illustrating the latch assembly installed in an opening in a door and a spindle installed into the spindle gap of the latch assembly.

FIG. 1 illustrates an example latch assembly 10 according to an embodiment of this disclosure, and FIG. 10 illustrates the latch assembly 10 as installed in a door 7. In an exemplary embodiment, the latch assembly 10 includes a bolt 6 that rotates and/or moves between an extended position (as shown in FIG. 1) in which the bolt 6 extends from a face plate 11 and a retracted position (see FIG. 6B) in which an outer tip or end 5 of the bolt 6 is positioned to be approximately flush with the face plate 11. In the extended position, the bolt 6 is received in a strike plate or strike pocket (not shown) of a door frame and is blocked from pivoting and/or moving inward to keep the door 7 in a closed position. Accordingly, the latch assembly 10 is in a latched position. Upon rotation of a door knob 3, the bolt 6 is unblocked and freely pivots and moves inward upon pushing/pulling the door 7 to be opened (via, for example, force upon the bolt from the strike plate).

The latch assembly 10 is typically actuated by rotating a door handle, which could be a door knob, door lever, or other handle device. Unlike existing latch assemblies, however, the door handle of an illustrative embodiment is not directly used to pivot or move the bolt inward, but rather is used to block or unblock movement of the bolt 6 via a dead locking assembly 20 within a cavity 4 of the latch assembly 10. The dead locking assembly 20 is movable from a locked position, which prevents the bolt 6 from moving inward or pivoting into the cavity 4 of the latch assembly 10, to an unlocked position, which allows the bolt 6 to freely pivot and move to the retracted position within the cavity 4 upon pushing/pulling the door 7 and permitting the strike box to apply a force to the bolt 6. Accordingly, the latch assembly 10 operates differently in this embodiment than a direct mechanical push/pull translation to extend/retract the bolt 6. Embodiments are also contemplated in which latch assembly 10 could be employed in an electronic lock in which the latch assembly 10 may be actuated with a motor or other electronically-controlled mechanism to move the dead locking assembly 20 from the locked to the unlocked position. In various examples, there may be an exterior door handle and an interior door handle that could each actuate the latch assembly 10 to operate the dead locking assembly 20 to allow opening of the door 7.

In various embodiments, the bolt 6 includes an angled surface 23 that slopes toward an exterior surface of the door 7 and a straight surface 21 that is positioned toward an interior surface of the door 7. When the door 7 is being closed, the angled surface 23 acts as a cam with the doorjamb or strike plate (not shown) to move the bolt 6 within the latch assembly 10 so that the bolt 6 can pass by the door plate and enter the strike box to retain the door in a closed position. Accordingly, the strike plate applies a force upon the bolt 6 via the angled surface 23 during closing. The straight surface 21 prevents the door from being opened inward (after the door is closed) without rotation and/or inward movement of the bolt 6 (which is permitted when the dead locking assembly 20 does not block the bolt 6), as the straight surface 21 will abut against an inner portion of the strike box when the bolt 6 is retained therein. The bolt 6 may further be formed to include a pivot aperture 13 through which a pivot pin 60 extends, with the bolt 6 rotating about pivot pin 60 and the pivot pin 60 connecting the bolt 6 to the rest of the latch assembly 10. The bolt 6 further includes one or more engagement surfaces 25 that are generally opposite the end of the bolt 6 and configured to be maintained within the cavity 4. The engagement surface 25 is configured to be engaged by other components to apply an outward force onto the bolt 6 to cause it to be in the extended position, as will be understood from the disclosure herein. The bolt 6 may further include a fin 9 that is configured to abut against a shoulder portion 88 of a housing 14 to prevent the bolt 6 from sliding completely out of the housing 14.

Figure 2:
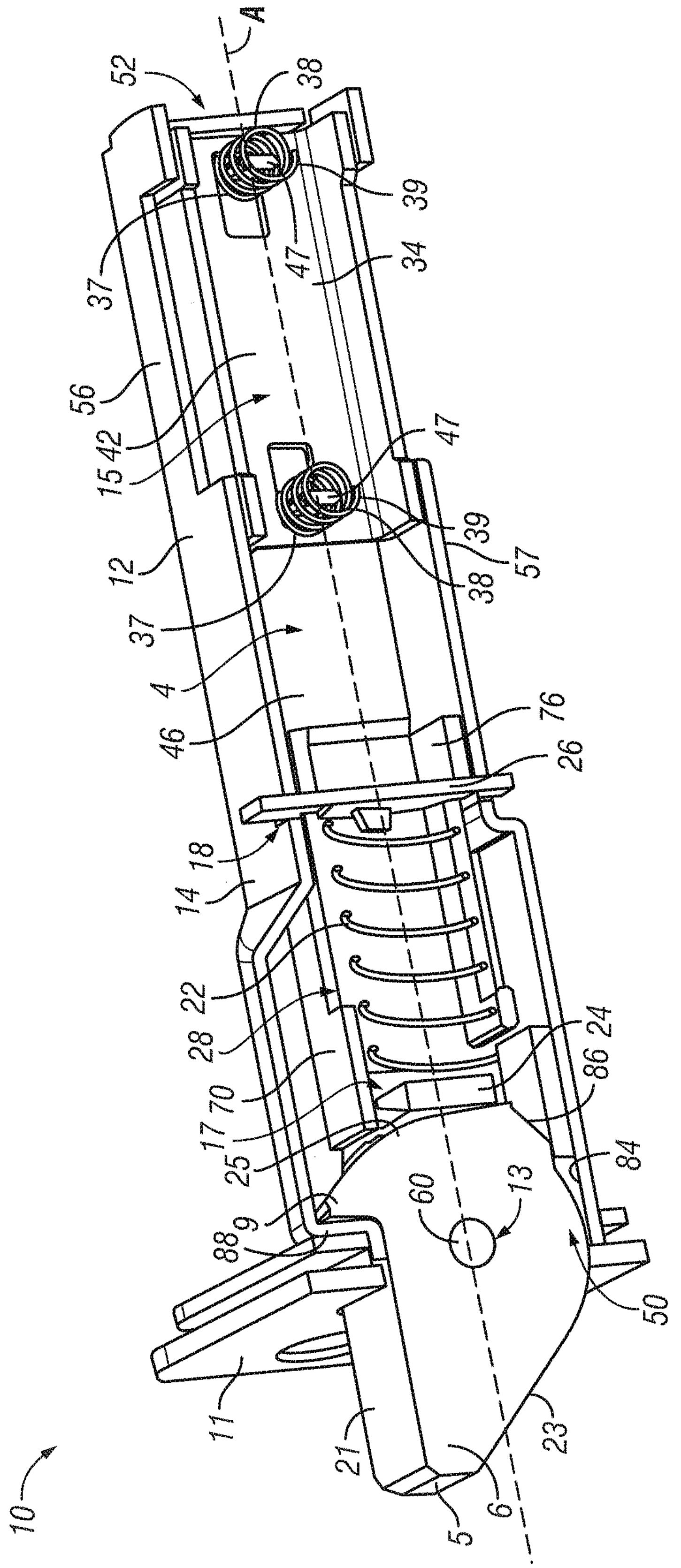
FIG. 2 is a perspective cross-sectional view perspective view of the latch assembly of FIG. 1 taken along the line 2-2.

FIG. 2 illustrates a cross-section of the latch assembly 10 of FIG. 1 prior to installation in the door 7. The cross-sectional view of FIG. 2 is taken along line 2-2 of FIG. 1 and illustrates a cross-section of the latch assembly 10 that is along a horizontal plane that intersects the door 7 substantially perpendicular to the exterior and interior surfaces of the door 7. As shown, the latch assembly 10 includes an external housing or sleeve 14 that is configured to be received within an aperture of the door 7. Specifically, when the latch assembly 10 is installed, the housing 14 is primarily disposed in a cross bore 8 in the door 7, as illustrated in FIG. 10. As shown, the housing 14 has an open first end 50 and a second end 52 that is configured to be received within the cross bore 8. The housing 14 substantially extends along a longitudinal axis A, as illustrated in FIG. 2. The housing 14 includes an annular wall 12 that extends between the first end 50 and the second end 52 along the longitudinal axis A, the annular wall 12 defining the cavity 4 of the housing 14. The bolt 6 extends out of the open first end 50 in its extended position (as shown in FIG. 2) and may be blocked from pivoting into the cavity 4 to keep the door 7 closed as discussed below. When a user wants to open the door, rotating the door handle unblocks the bolt 6 as described below so it can freely pivot and move to a retracted position inside the cavity 4 of the housing 14 as the door is pushed/pulled.

Figure 11A:
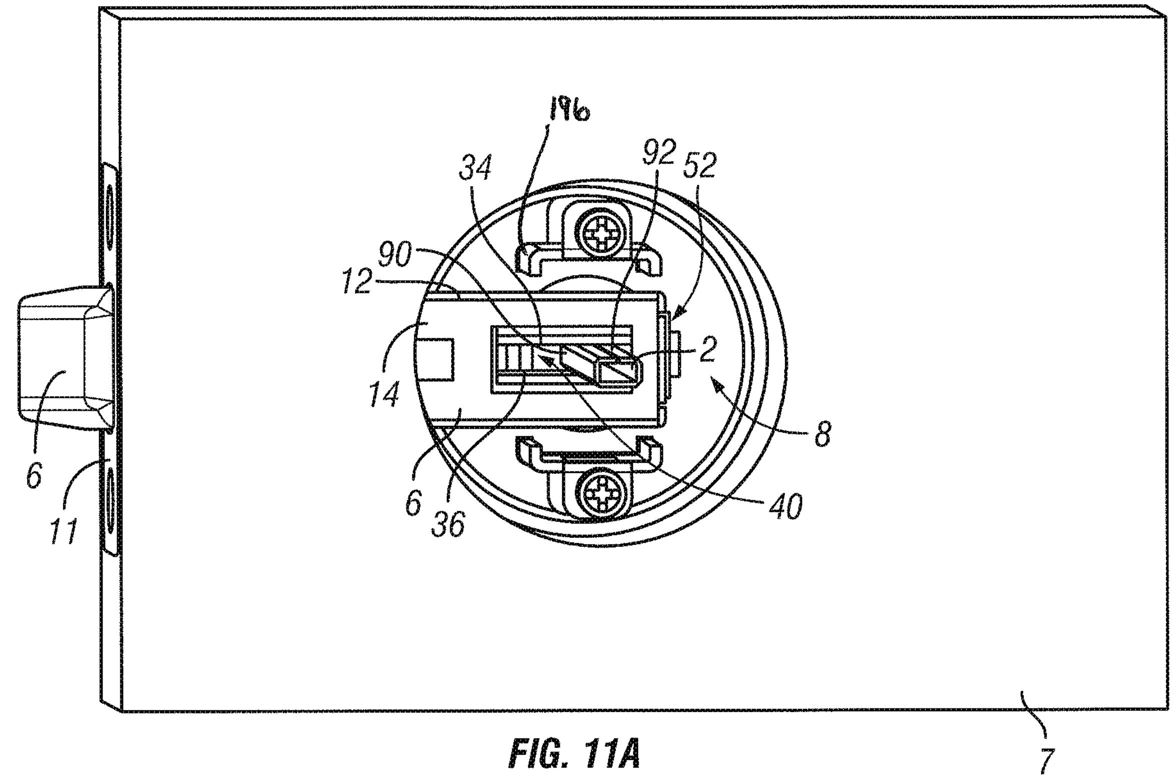
FIG. 11A is a side perspective view of the latch assembly in the door opening with the spindle extending through the spindle gap of the latch assembly, illustrating the spindle extending through the spindle gap and maintained in a neutral or non-rotated state when no rotation force is applied to the door knob.

In various embodiments, the annular wall 12 of the housing 14 includes two opposite wall surfaces 56 and 57 that define a bore 15 through the housing 14, which includes a torque blade or spindle 2 connected to the door handle 3 that can extend to actuate the latch assembly 10. Specifically, the spindle 2 can rotate with rotation of the door handle 3 to actuate or disengage the dead locking assembly 20 to permit the bolt 6 to move from the extended position to the retracted position, as illustrated in FIGS. 11A-111B. In the example shown, the bore 15 of the housing 14 is coaxial with the cross bore 8 to receive the torque blade 2 of door handle 3 that can be used to disengage the dead locking assembly 20. In various embodiments, it is within the scope of this disclosure that the housing 14 may be comprised of multiple components that are slidably coupled together to adjust a backset of the latch assembly 10 within the door 7.

Referring again to FIG. 2, the latch assembly 10 includes the bolt 6 that is pivotable and movable within the cavity 4 of the housing 14 and the dead locking assembly 20. In the example shown, the bolt 6 is pivotally connected to a portion of the dead locking assembly 20. The bolt 6 is configured to pivot about the pivot pin 60 as it moves between its extended and retracted positions when the door is opened. Further, both the bolt 6 and the dead locking assembly 20 are movable within the cavity 4 of the housing 14 to move the bolt 6 into and out of the first end 50 of the housing 14. As illustrated, for example, in FIG. 3A, FIG. 5, and FIG. 6A, the bolt 6 moves from a fully extended position E, to a partially extended position P, to a fully retracted position R as it pivots about the pivot pin 60 and moves further into the cavity 4 of the housing 14. The bolt 6 moves through these positions when a force is applied to the straight surface 21 of the bolt 6 from an internal surface of the strike box and when the dead locking assembly 20 does not block the bolt 6 from moving inward into the cavity 4.

As illustrated in FIG. 2, the latch assembly 10 further comprises a bias member 22, which may be in the form a spring. The bias member 22 is configured to bias the bolt 6 out of the first end 50 of the housing 14 to the extended position E. For example, the bias member 22 includes a first end 29 that is configured to abut against a portion of the engagement surface 25 of the bolt 6 and a second end 27 that is configured to abut against a bias stop 26 of the latch assembly 10. In various embodiments, the bias stop 26 may be integrally formed with a portion of the housing 14 of the latch assembly, although other embodiments are envisioned herein. The bias stop 26 may substantially be a fixed point along the longitudinal axis A of the housing 14 upon which the bias member 22 abuts in order to provide a bias force upon the bolt 6. When the door 7 is being closed, the angled surface 23 of the bolt 6 acts as a cam with the strike plate or door jamb to overcome the urging of the bias member 22 to move the bolt 6 toward the retracted position R. When the door closes, the bolt 6 will align with an opening in the strike box, and the bias member 22 will urge the bolt 6 back into its extended position E. Accordingly, the bolt 6 is urged toward its extended position by the urging of the bias member 22 when no other forces act upon the bolt 6.

The dead locking assembly 20 will now be described. As illustrated in FIGS. 1-3B, the dead locking assembly 20 includes a locking bar assembly 30 and a blocking cartridge 32 that are received within the cavity 4 of the housing 14. The locking bar assembly 30 and blocking cartridge 32 are configured to engage with each other to block or unblock movement of the bolt 6 into and out of the housing 14. In particular, the locking bar assembly 30 is configured to block inward movement of the blocking cartridge 32 in a blocking state to prevent movement of the blocking cartridge 32 toward the locking bar assembly 30, which in turn will prevent inward movement of the bolt 6. The locking bar assembly 30 is engageable by the spindle 2 to move to an unblocking state that permits inward movement of the blocking cartridge 32 toward the locking bar assembly 30, thereby unblocking inward movement of the bolt 6.

Figure 3A:
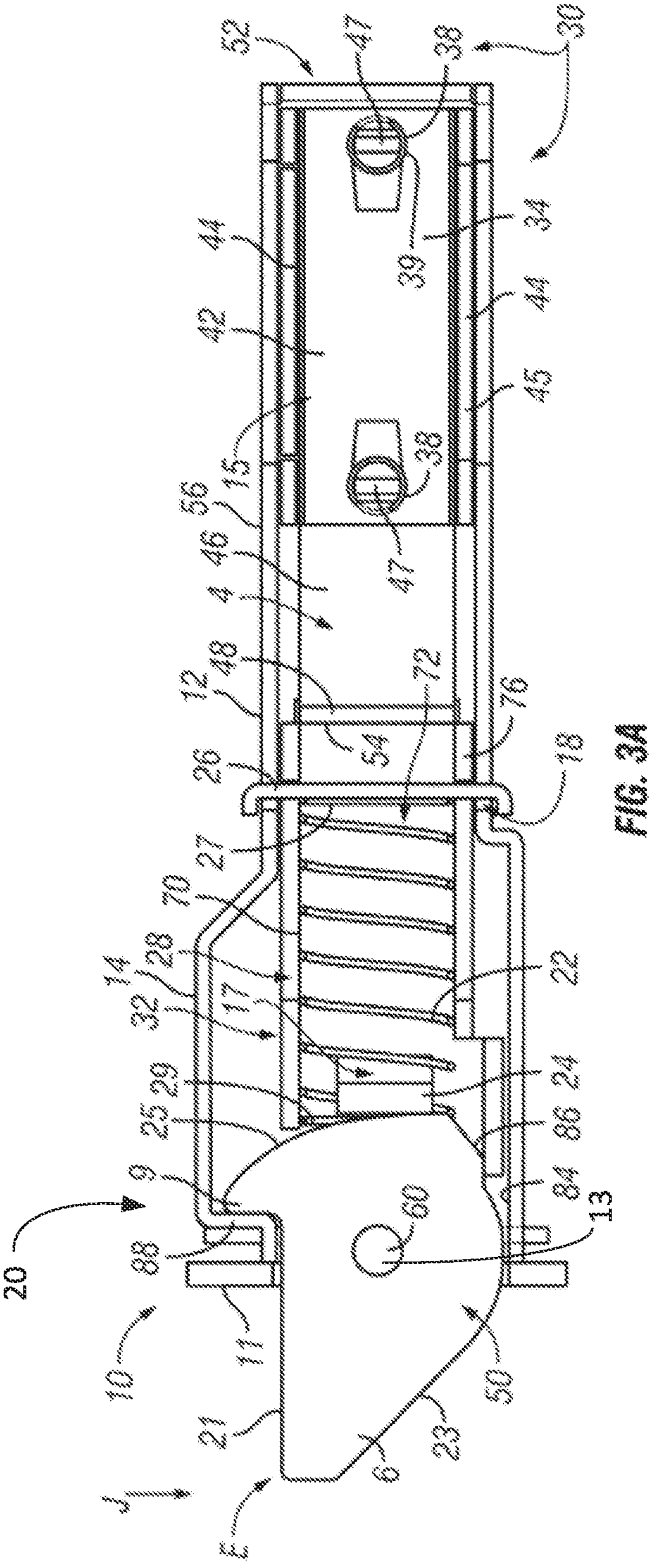
FIG. 3A is a cross-section of the latch assembly of FIG. 1 taken along line 2-2, illustrating a top down cross-sectional view of the latch assembly in an extended and locked state wherein a bolt of the latch assembly is prevented from moving inward by a dead locking assembly within the latch assembly.
Figure 3B:
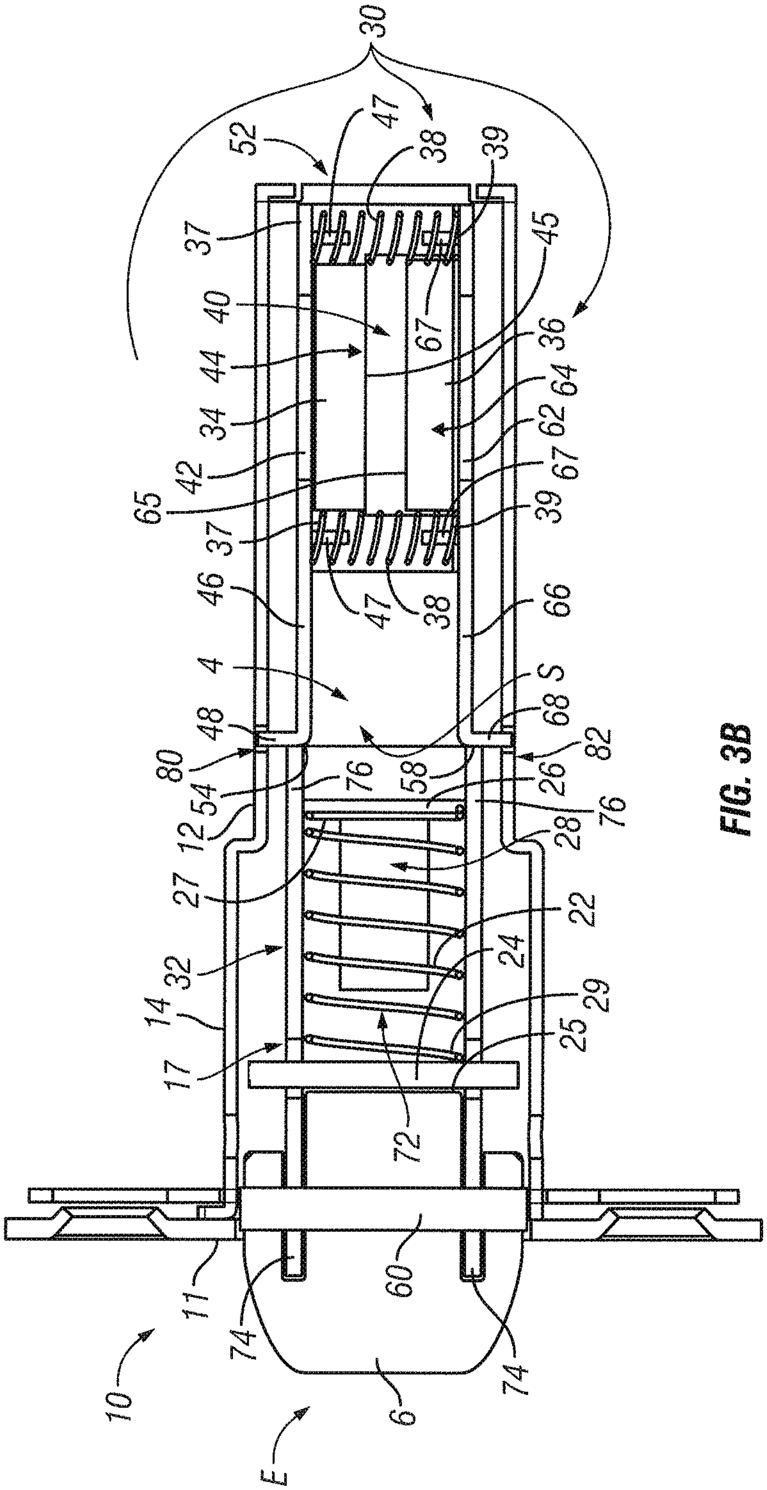
FIG. 3B is an alternative cross-sectional view of the latch assembly of FIG. 1, illustrating a side cross-sectional view of the latch assembly in a similar position as in FIG. 3A but at a 90 degree angle thereto, the latch assembly including a spindle gap in the dead locking assembly that is small or minimized, and the dead locking assembly including one or more locking bars that prevent inward movement of a dead latch cartridge, thereby preventing inward movement of the bolt.

As illustrated in FIGS. 3A-3B, the locking bar assembly 30 includes a first locking bar 34, a second locking bar 36, and one or more biasing members 38 that extend between the first and second locking bars 34 and 36. The locking bars 34, 36 are spaced away from each other to form a spindle gap 40 therebetween. The biasing members 38 are configured to retain the locking bars 34, 36 in a closed or nearly closed position wherein the spindle gap 40 is small, as illustrated in FIG. 3B, but the locking bars 34, 36 are movable to an open position where the locking bars 34, 36 are spaced away from each other to expand the spindle gap 40 to be larger. In various embodiments, however, the locking bar assembly 30 may only include a first locking bar 34 and a biasing member 38 that biases the first locking bar 34 into a position closer to the longitudinal axis, with the first locking bar 34 movable away from the longitudinal axis by rotation of a spindle, as one of skill would understand from further description below.

Figure 13B:
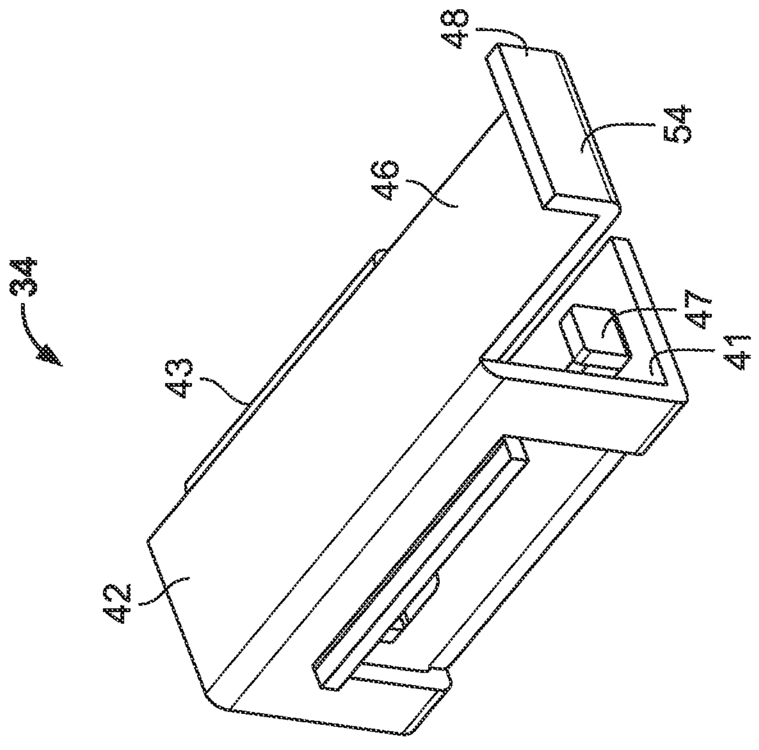
FIGS. 13A and 13B are front and back perspective views of a locking bar of the latch assembly of FIG. 1.
Figure 13A:
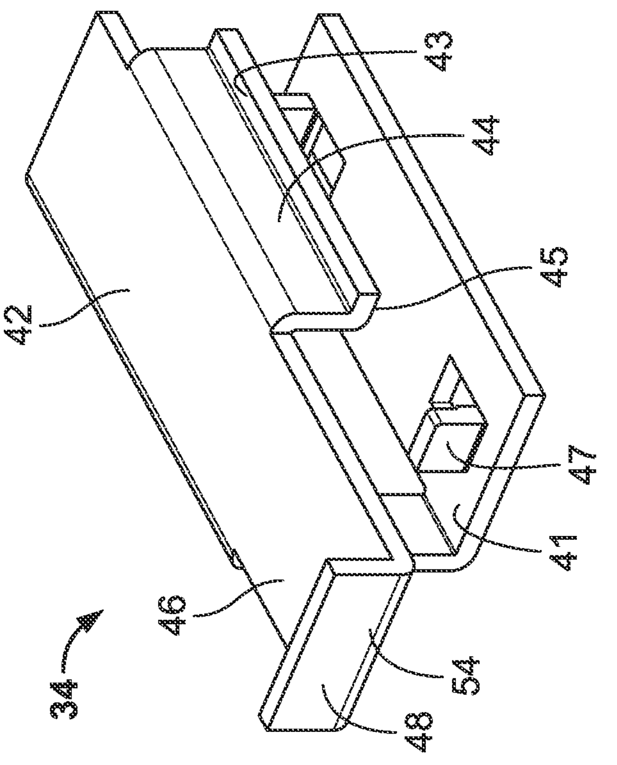

An illustrative embodiment of the locking bars 34, 36 will now be described. However, other forms of locking bars 34, 36 are envisioned within the scope of this disclosure. Further, as described herein, the locking bars 34, 36 may have similar or identical components, or they may be comprised of different components. The locking bars 34, 36 may be mirror images of each other, or the locking bar 34 may include additional components that are not included in the locking bar 36. Regardless of the design, the locking bars 34, 36 are configured to work together to block or unblock movement of the blocking cartridge 32 as described herein. An illustrative example of the locking bar 34 is shown in FIGS. 13A-13B.

As illustrated in FIGS. 3A-3B and 13A-13B, the first locking bar 34 illustratively includes a bar base 42 configured to extend along the longitudinal axis A of the housing 14, one or more engagement tabs 44 configured to extend substantially perpendicular to the bar base 42, an extension arm 46 configured to be substantially planar with the bar base 42, and one or more arm tabs 48 that extend from the extension arm 46 and may be substantially perpendicular to the extension arm 46. In various embodiments, the engagement tabs 44 and arm tab 48 may be substantially parallel to each other, but extend in opposite directions from the base 42 and extension arm 46. Each engagement tab 44 includes an engagement surface 45 which partially defines the spindle gap 40 and is configured to abut against the spindle 2 that is rotated by the handle 3 when a user operates the latch assembly 10. Accordingly, the engagement tabs 44 may extend into the bore 15 and be coaxial with the bore 15 so as to be engaged by the spindle 2 when it is received through the bore 15.

Similarly, the second locking bar 36 illustratively includes a bar base 62 configured to extend along the longitudinal axis A of the housing 14, one or more engagement tabs 64 configured to extend substantially perpendicular to the bar base 62, an extension arm 66 configured to be substantially planar with the bar base 62, and one or more arm tabs 68 that extend from the extension arm 66 and may be substantially perpendicular to the extension arm 66. In various embodiments, the engagement tabs 64 and arm tab 68 may be substantially parallel to each other, but extend in opposite directions from the bar base 62 and extension arm 66.

The engagement tabs 64 include an engagement surface 65 which partially define the spindle gap 40 and are configured to abut against the spindle 2 that is rotated by the handle 3 when a user operates the latch assembly 10. Accordingly, the engagement tabs 64 may extend into the bore 15 and be coaxial with the bore 15 so as to be engaged by the spindle 2 when it is received through the bore 15. As illustrated in FIG. 3B, the engagement tabs 44 and 64 and their respective engagement surfaces 45 and 65 are configured to define the spindle gap 40 therebetween. In various embodiments, and as illustrated in FIG. 13A, an engagement lip 43 may extend from the engagement surface 45 to provide further contact surface between the spindle 2 and the locking bar 34.

In illustrative embodiments, the one or more biasing members 38 are retained between the bases 42 and 62 of the locking bars 34 and 36 and configured to bias the locking bars 34, 36 toward each other to narrow or close the spindle gap 40 between the engagement tabs 44 and 64. The biasing members 38 may illustratively be a helical spring that is coupled to the locking bars 34, 36 and pulls the locking bars 34, 36 toward each other, although other embodiments are envisioned herein. In certain embodiments, the biasing members 38 may be oriented or partially retained in connection with the locking bars 34, 36 by one or more spring retainers 47 on the locking bar 34 and one or more spring retainers 67 on the locking bar 36.

For example, the spring retainers 47 may be coupled to a connector arm 41 of the locking bar 34 that extends from the bar base 42, as illustrated in FIGS. 13A-13B. In illustrative embodiments, the spring retainers 47 and 67 may be coupled to the bar bases 42, 62 to move therewith and may extend substantially perpendicular to the bar bases 42, 62 to be received within opposite ends 37 and 39 of the biasing member 38, as illustrated for example in FIGS. 2 and 3B. The biasing member 38 may be a tension spring that naturally biases the ends 37, 39 close together, thereby biasing the locking bars 34, 36 close together, as is understood by one skilled in the art.

As illustrated in FIGS. 3A and 3B, the extension arms 46, 66 are configured to extend parallel to the longitudinal axis A of FIG. 2 within the cavity 4 of the housing 14 toward the blocking cartridge 32. The arm or locking tabs 48, 68 extending from the extension arms 46, 66 provide abutment surfaces 54, 58, respectively, upon which a portion of the blocking cartridge 32 abuts to block inward movement of the blocking cartridge 32 along the longitudinal axis A. In various embodiments, the abutment surfaces 54, 58 may be rounded, as illustrated in FIGS. 13A-13B, or may be configured to have a sharp or angled shape, although other embodiments are envisioned herein. The locking tabs 48, 68 of the locking bars 34, 36 are configured to extend through tab apertures 80 and 82 formed within the housing 14 and are movable therethrough in a direction that is generally perpendicular to the longitudinal axis A. The locking tabs 48, 68 are configured to move through the apertures 80, 82 when the locking bars 34, 36 are moved away from each other to widen the spindle gap 40 when the spindle 2 is rotated, as further described herein, which widens a space S between the locking tabs 48, 68. When the distance between the locking tabs 48, 68 is widened, the blocking cartridge 32 no longer abuts against abutment surfaces 54, 58, permitting the blocking cartridge 32 to move inward within the space S.

In illustrative embodiments, the blocking cartridge 32 includes an annular housing 70 that is configured to be slidable within the cavity 4 toward and away from the locking bar assembly 30. The annular housing 70 defines a bias cavity 72 through the blocking cartridge 32 that is generally aligned with the longitudinal axis A of the housing 14. In various embodiments, the bias member 22 extends within the bias cavity 72 to abut against the bolt 6. The annular housing 70 of the blocking cartridge 32 includes a first end 74 and a second end 76 that substantially define the ends of the housing 70. The first end 74 is configured to be coupled to a portion of the bolt 6 and the second end 76 is configured to abut against the abutment surfaces 54, 58 of the extension arms 46, 66 of the locking bars 34, 36, as illustrated in FIG. 3B. When the second end 76 abuts against the extension arms 46, 66, inward movement of the blocking cartridge 32 is prevented, which further prevents inward rotation and/or movement of the bolt 6 from the extended position E.

In various embodiments, the blocking cartridge 32 further includes a bias stop aperture 28 that permits the blocking cartridge 32 to move around the bias stop 26 as the blocking cartridge 32 moves inward. The bias stop 26 may be retained in a fixed position relative to the housing 14 by extending through one or more stop retainment apertures 18 that extend through the housing 14 as the blocking cartridge 32 moves within the housing 14.

In illustrative embodiments, the latch assembly 10 further comprises a half way stop 24 that extends through a portion of the blocking cartridge 32 and is configured to abut against the engagement surface 25 of the bolt 6 to retain the bolt 6 in a position where the bolt 6 partially extends out of the open first end 50. As illustrated in FIGS. 3A-3B, the half way stop 24 may be configured to extend within the inner circumference of the bias member 22 and may be prevented from substantial movement longitudinally with respect to the blocking cartridge 32 by one or more stop retainment apertures 17 formed within the housing 70 of the blocking cartridge 32. In such a manner, the half way stop 24 provides a means for retaining the bolt 6 in a half way out position relative to the opening 50, as the half way stop 24 is limited in longitudinally inward movement by the size and placement of the stop retainment apertures 17.

An illustrative operation of the latch assembly 10 will now be described. FIGS. 3A-6B illustrate how the latch assembly 10 is operated, and how the dead latch function is deactivated, during operation of opening the door from a latched position. FIGS. 7A-9B illustrate how the latch assembly 10 operates when the door moves from an open position where it is not latched with the doorjamb to a closed position where it is latched to the doorjamb and the dead latch function is reactivated.

As illustrated in FIGS. 3A-3B, the bolt 6 is in the fully extended position E when the bolt 6 is received within a strike box of the door 7 and the latch assembly 10 is in a closed position. If a pressure or force J from the doorjamb is applied to the bolt 6 in an unauthorized manner, the dead locking assembly 20 prevents the bolt 6 from rotating or moving inward from the extended position E. In particular, the second end 76 of the blocking cartridge 32 is aligned with and abuts against the abutment surfaces 54, 58 of the locking bars 34, 36, respectively, and the blocking cartridge 32 is prevented from moving longitudinally inward by engagement between the second end 76 of the blocking cartridge 32 and the abutment surfaces 54, 58. As illustrated in FIG. 3B, the spindle gap 40 between the engagement tabs 44, 64 of the locking bars 34, 36 is smaller, and the engagement tabs 44, 64 are biased toward each other via the biasing members 38, causing the arm tabs 48, 68 of the locking bars 34, 36 to be aligned with the end 76 of the blocking cartridge 32. As the blocking cartridge is affixed against the bolt 6, the bolt 6 is prevented from inward movement, effectively locking the latch assembly 10 in the closed position.

Figure 4:
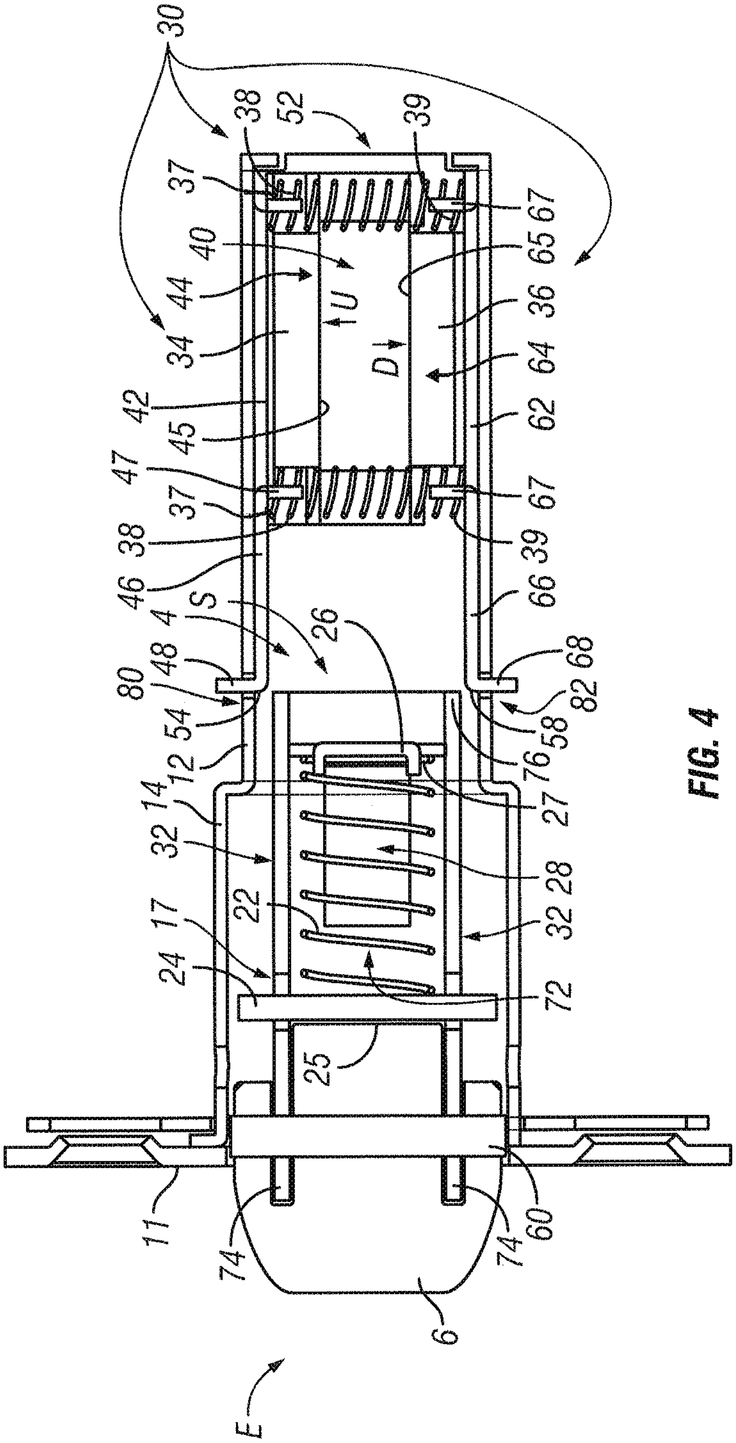
FIG. 4 is a side cross-sectional view of the latch assembly of FIG. 1 similar to FIG. 3B, illustrating the spindle gap of the dead locking assembly has been widened or increased due to rotation of a spindle from a door knob.

FIG. 4 illustrates operation of the dead locking assembly 20 when a user actuates the handle or knob to turn or rotate the spindle 2 within the spindle gap 40. In illustrative embodiments, the spindle 2 is asymmetrical and turning of the spindle 2 causes the spindle 2 to apply upward pressure U on the engagement tab 44 of the first locking bar 34 and downward pressure or force D on the engagement tab 64 of the second locking bar 36 due to the larger cross-sectional distance of the spindle 2 in the rotated position. These upward and down forces U and D cause the locking bars 34, 36 to move away from each other against the bias of the biasing member 38, expanding the spindle gap 40. Such movement further causes the extension arms 46, 66 to move away from each other, and the arm tabs 48, 68 extend outward from the longitudinal axis A through the tab apertures 80, 82. This widens the space S between the extension arms 46, 66 to a point where the ends 76 of the blocking cartridge 32 no longer abut against the abutment surfaces 54, 58. At this point, the blocking cartridge 32 can move inward along the longitudinal axis A toward the second end 52 of the housing 14 when a force is applied to the bolt 6.

Figure 5:
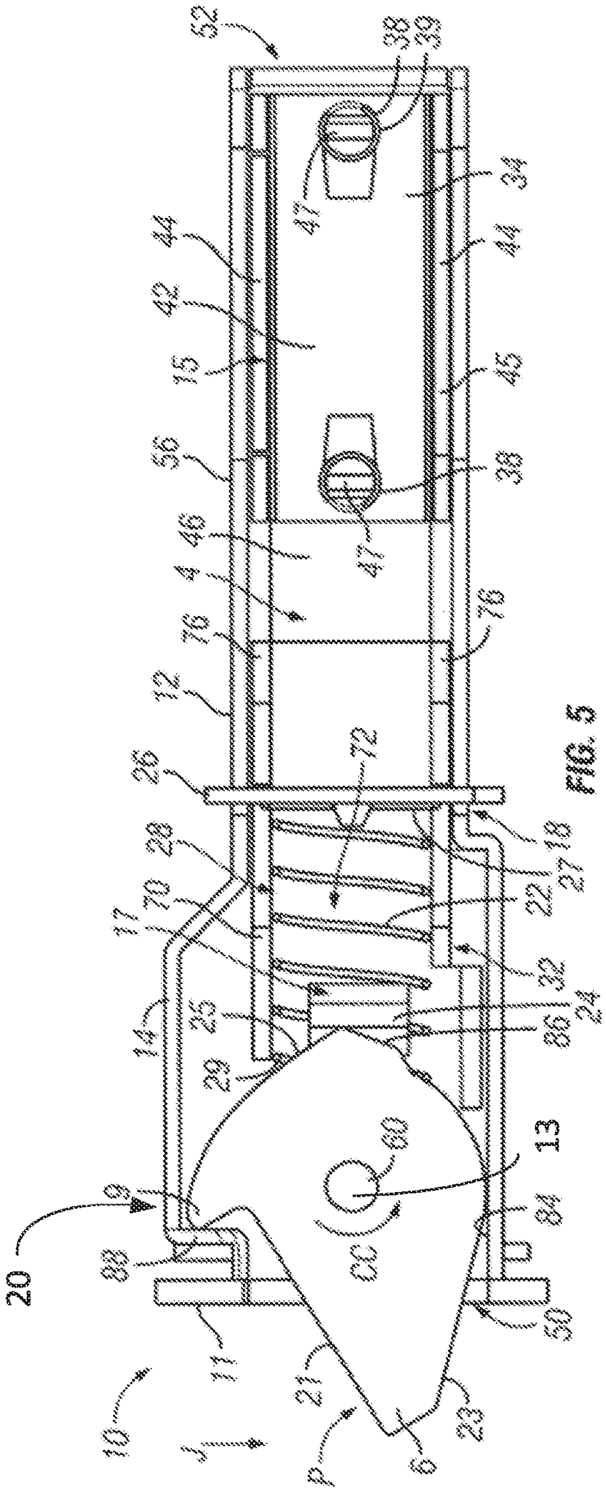
FIG. 5 is a cross-section of the latch assembly of FIG. 1 taken along line 2-2, illustrating a top down cross-sectional view of the latch assembly in the process of moving into a retracted position, wherein a force is applied to the bolt of the latch assembly from the strike box and the bolt is not prevented from moving inward due to application of such force.

FIG. 5 illustrates operation of the latch assembly 10 after the dead locking assembly 20 has been disengaged as illustrated in FIG. 4. In particular, when a force J from a doorjamb or strike box is applied to the bolt 6, the bolt 6 will no longer be prevented from pivoting and moving inward inside the housing 14 by the blocking cartridge 32, as the blocking cartridge 32 itself will be permitted to move inward and slide within the space S between the extension arms 46, 66 of the locking bars 34, 36. The bolt 6 will pivot and move inward against the bias of the bias member 22, which is fixedly secured at the second end 27 of the bias member against the bias stop 26 that is fixedly maintained relative to the housing 14 by engagement with the stop retainment apertures 18. The force J will cause the bolt 6 to rotate in a perpendicular direction with respect to the sleeve 14 to a partially retracted position P, and then to a position where the angled surface 23 of the bolt 6 abuts against an inner surface 84 of the housing 14 where the bolt 6 no longer rotates. The force J will continue to push the bolt 6 in an inward direction against the bias of the bias member 22 as the bolt 6 attempts to clear the door jamb, sliding the blocking cartridge 32 further inward inside the housing 14. When the angled surface 23 of the bolt 6 engages with the inner surface 84, a catch surface 86 on the engagement surface 25 of the bolt 6 mates or frictionally engages with the half way stop 24 to prevent rotation of the bolt 6 in a direction opposite the direction CC (e.g., toward the extended position E).

In various embodiments, the half way stop 24 may be provided clearance to move a small amount of clearance within the stop retainment aperture 17 along the longitudinal axis A to permit the catch surface 86 to frictionally engage with the half way stop 24, as can be understood by a person of ordinary skill in the relevant art. The bolt 6 is now effectively blocked from rotating further past the inner surface 84 or back away from the inner surface 84 of the housing 14. This creates a half-way stop feature of the bolt 6 that is utilized when closing the door from an open position, as described below.

Figure 6A:
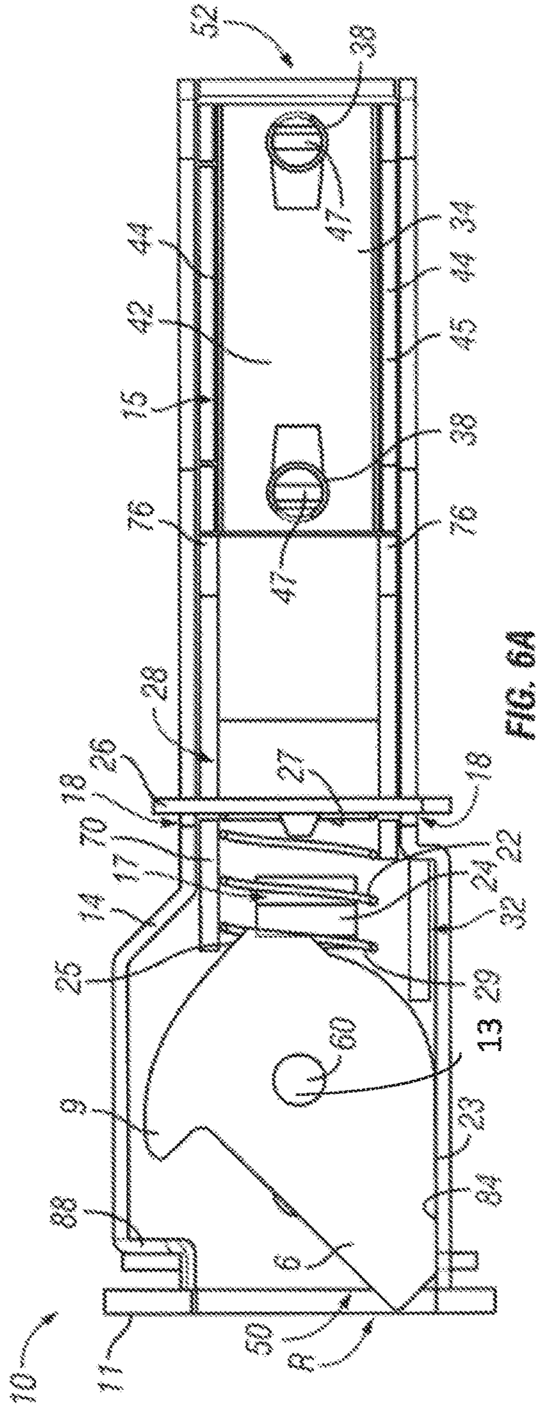
FIG. 6A is a cross-section section of the latch assembly of FIG. 1 taken along line 2-2, illustrating a top down cross-sectional view of the latch assembly after the bolt has been fully retracted into the latch assembly to permit the bolt to pass the strike box.
Figure 6B:
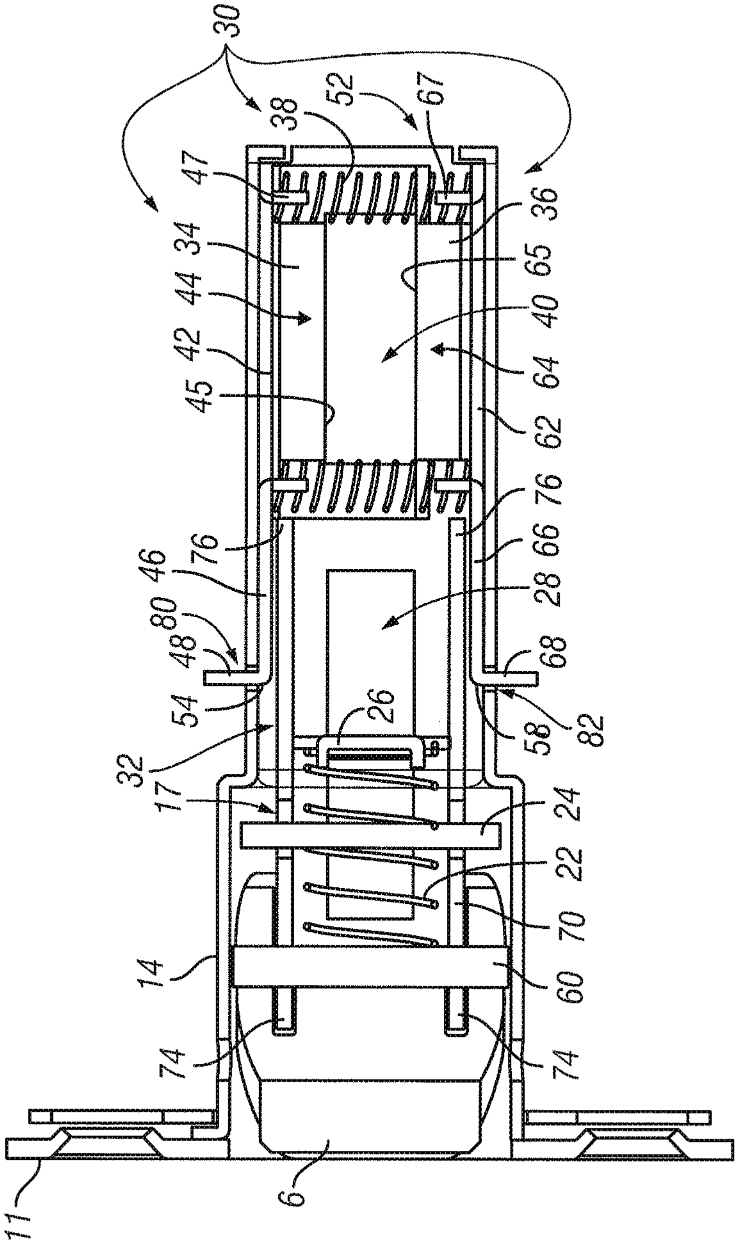
FIG. 6B is an alternative cross-sectional view of the latch assembly of FIG. 1 and illustrating a side cross-sectional view of the latch assembly in a similar position as in FIG. 6A but at a 90 degree angle thereto, and further illustrating the one or more locking bars no longer prevent the dead lock cartridge of the dead locking assembly from moving inward to permit inward movement of the bolt.

FIGS. 6A-6B illustrate the latch assembly 10 when the bolt 6 has been moved to its fully retracted position R within the housing 14. The bolt 6 is pushed to this fully retracted position R by the force J from the strike plate or doorjamb as the bolt 6 is moved out of the strike box. The bolt 6 moves inside the housing 14 by overcoming the biasing force of the bias member 22 upon the engagement surface 25 of the bolt 6. At this point, the catch surface 86 is still engaged against the half way stop 24 to prevent rotation of the bolt 6. As illustrated in FIG. 6B, the second end 76 of the blocking cartridge 32 has moved further toward the second end 52 of the housing 14 between the extension arms 46, 66 of the locking bars 34, 36, and may even abut or be substantially close to the bar bases 42, 62 of the locking bars 34, 36. Movement of the bolt 6 to the fully retracted position R permits the bolt 6 to slide past the door jamb, permitting the door to be opened.

Figure 7A:
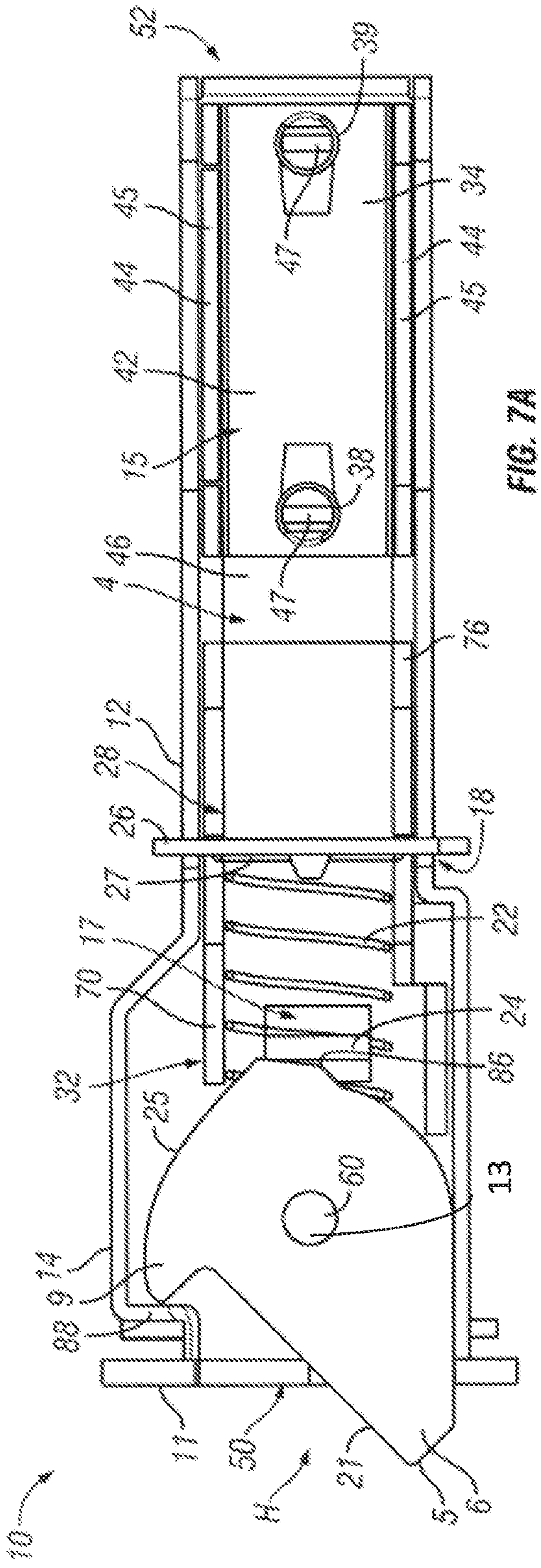
FIG. 7A is a cross-section of the latch assembly of FIG. 1 taken along line 2-2, illustrating a top down cross-sectional view of the latch assembly after the bolt has already passed the strike box when the door is in an open position, and further illustrating the bolt is maintained in a halfway out position and is rotated inward, the bolt including an internal geometry that abuts against a halfway stop of the latch assembly to prevent the bolt from fully extending out of the latch assembly.
Figure 7B:
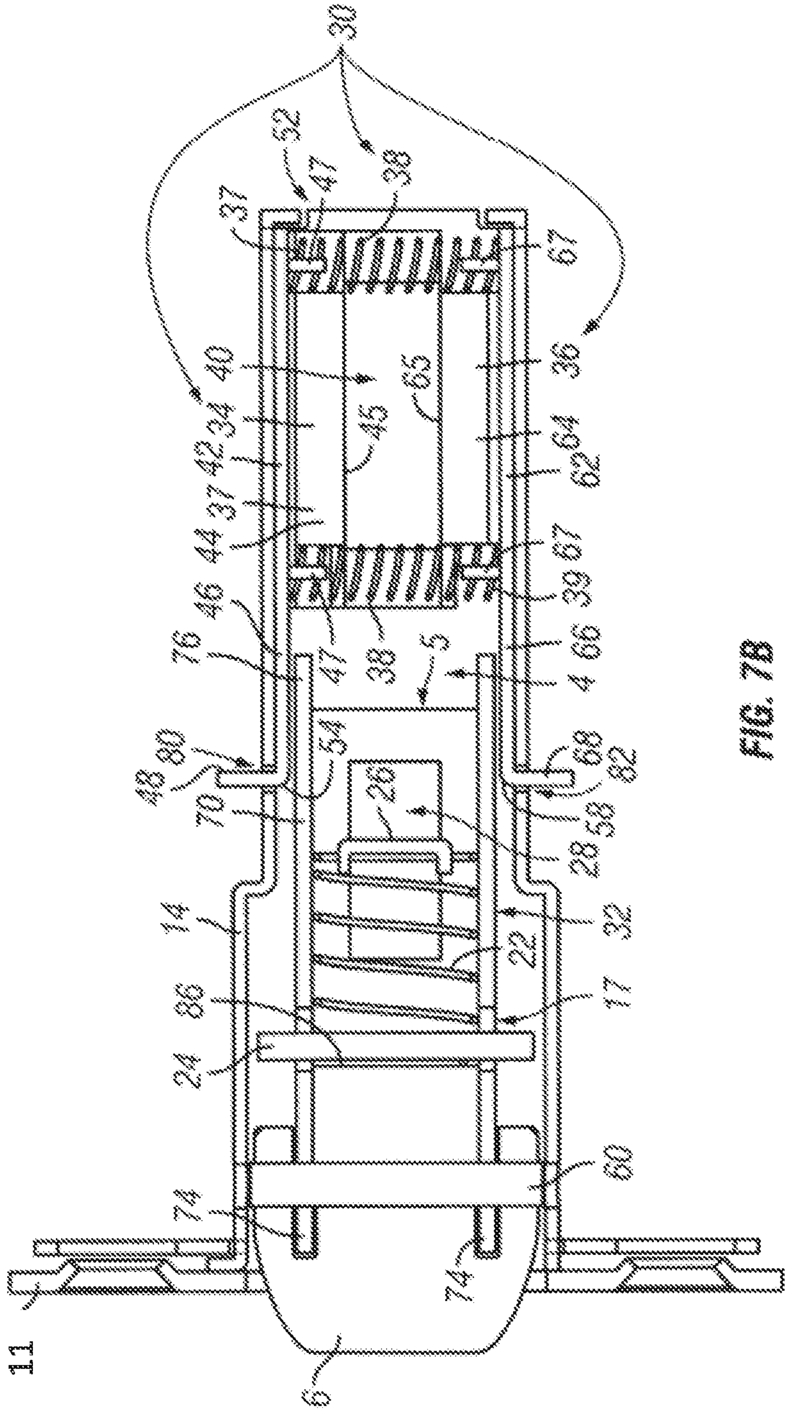
FIG. 7B is a an alternative cross-sectional view of the latch assembly of FIG. 1 and illustrating a side cross-sectional view of the latch assembly in a similar position as in FIG. 7A but at a 90 degree angle thereto.

FIGS. 7A-7B illustrate the latch assembly 10 as the door is closing from an open position, but before the bolt 6 engages with the doorjamb or strike plate. After the door has been opened, the bolt 6 no longer has the jamb force J upon it. Accordingly, the bolt 6 will begin to move out of the first end 50 of the housing 14 toward the extended position E because of the biasing force upon the bolt 6 from the bias member 22. However, as illustrated in FIG. 7A, the bolt 6 is prevented from returning fully to the extended position E because of the frictional engagement between the catch surface 86 and the half way stop 24. Because the bolt 6 is unable to rotate and the fin 9 of the bolt 6 cannot overcome the shoulder portion 88 of the housing 14, the bolt 6 is effectively retained at a half-way out position H. The blocking cartridge 32, which is attached to the bolt 6, has also moved further toward the first end 50 of the housing 14. However, as illustrated in FIG. 7B, the second end 76 of the blocking cartridge 32 still remains within the space S between the extension arms 46 and 66, effectively holding the extension arms 46, 66, and by extension the locking bars 34, 36, in a spaced-apart configuration. This retainment further causes the spindle gap 40 to be maintained in an open or wider position, even though the spindle 2 itself may no longer be rotated or turned by a user operating the door knob.

Figure 8A:
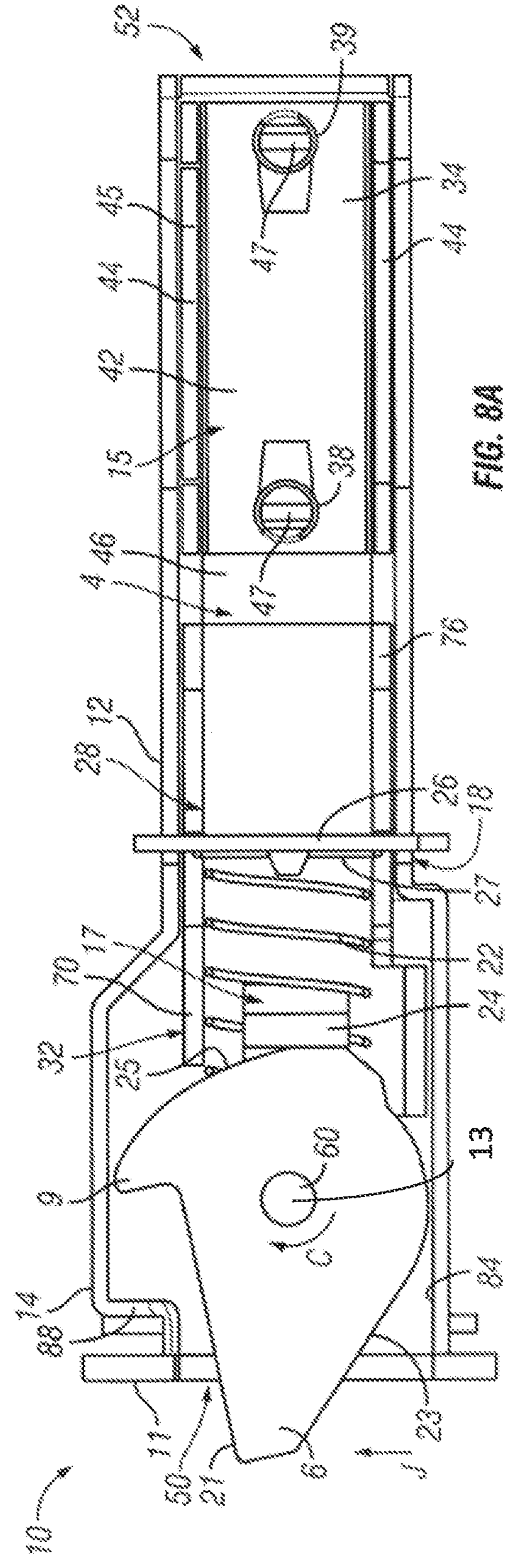
FIG. 8A is a cross-section of the latch assembly of FIG. 1 taken along line 2-2, illustrating a top down cross-sectional view of the latch assembly as the door is closing, and further illustrating a force from the strike box upon an angled surface of the halfway out bolt causing the bolt to continue to rotate and overcome the halfway stop of the latch assembly and permit the bolt to move back toward an extended position.
Figure 8B:
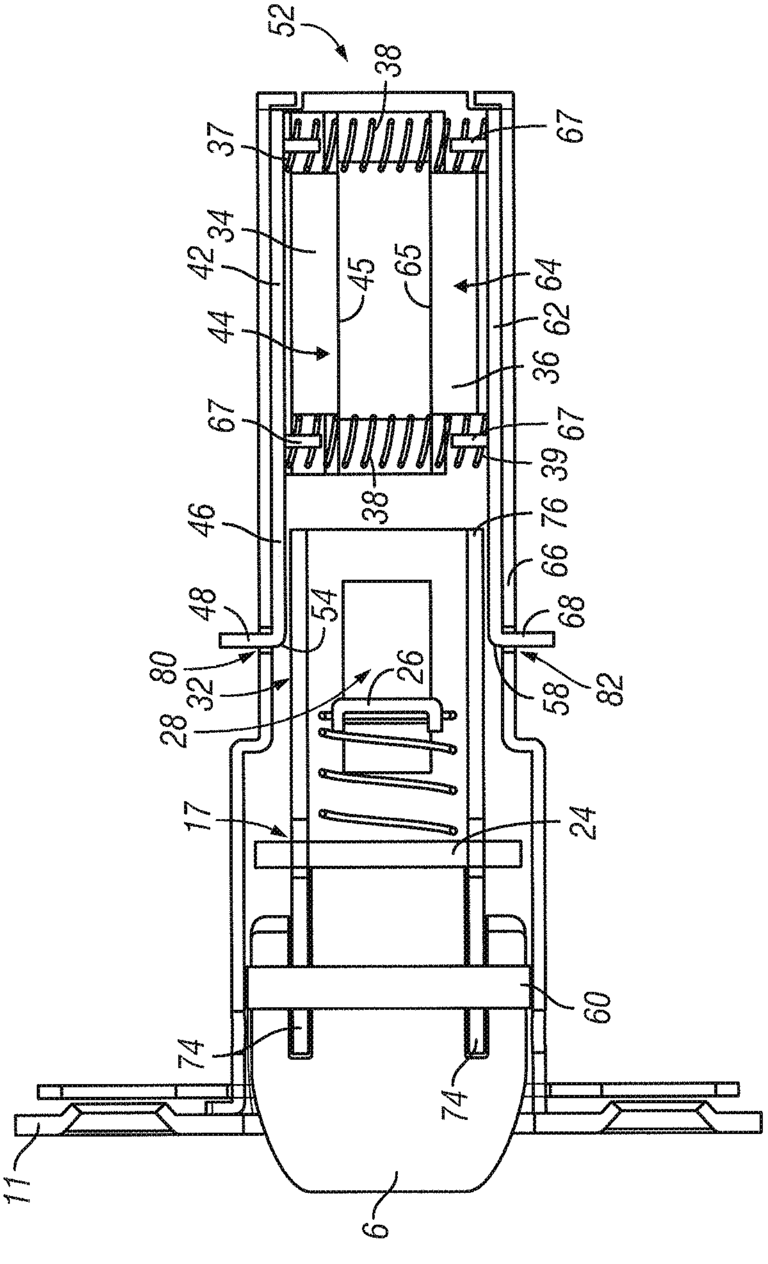
FIG. 8B is an alternative cross-sectional view of the latch assembly of FIG. 1 illustrating a side cross-sectional view of the latch assembly in a similar position as in FIG. 8A but at a 90 degree angle thereto.

FIGS. 8A-8B illustrate the latch assembly 10 as the bolt 6 engages with the door jamb upon closing of the door. As illustrated, a force J from the doorjamb is applied to the angled surface 23 of the bolt 6 when the bolt is in the half-way out position H. The force J is enough to force the bolt 6 to rotate about the pivot pin 60 past the half-way stop 24, overcoming the frictional engagement between the catch surface 86 and the half way stop 24. When the catch surface 86 is no longer restrained by the half way stop 24, the force J of the door jamb coupled with the biasing force of the bias member 22 cause the bolt 6 to rotate upward in a clockwise direction C. The bolt 6 is now free to move toward the fully extended position E again in light of the biasing force of the bias member 22. The blocking cartridge 32 will move toward the first end 50 of the housing 14 as the bolt 6 moves toward the fully extended position.

Figure 9A:
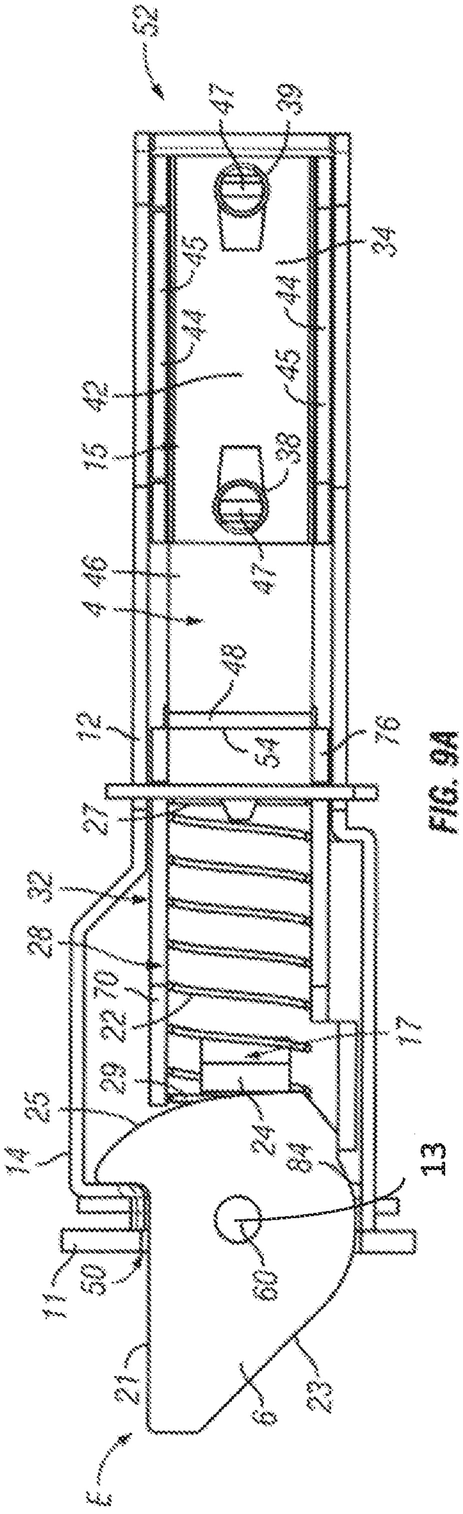
FIG. 9A is a cross-section of the latch assembly of FIG. 1 taken along line 2-2, illustrating a top down cross-sectional view of the latch assembly after the bolt has been fully extended into the strike box after the door has closed.
Figure 9B:
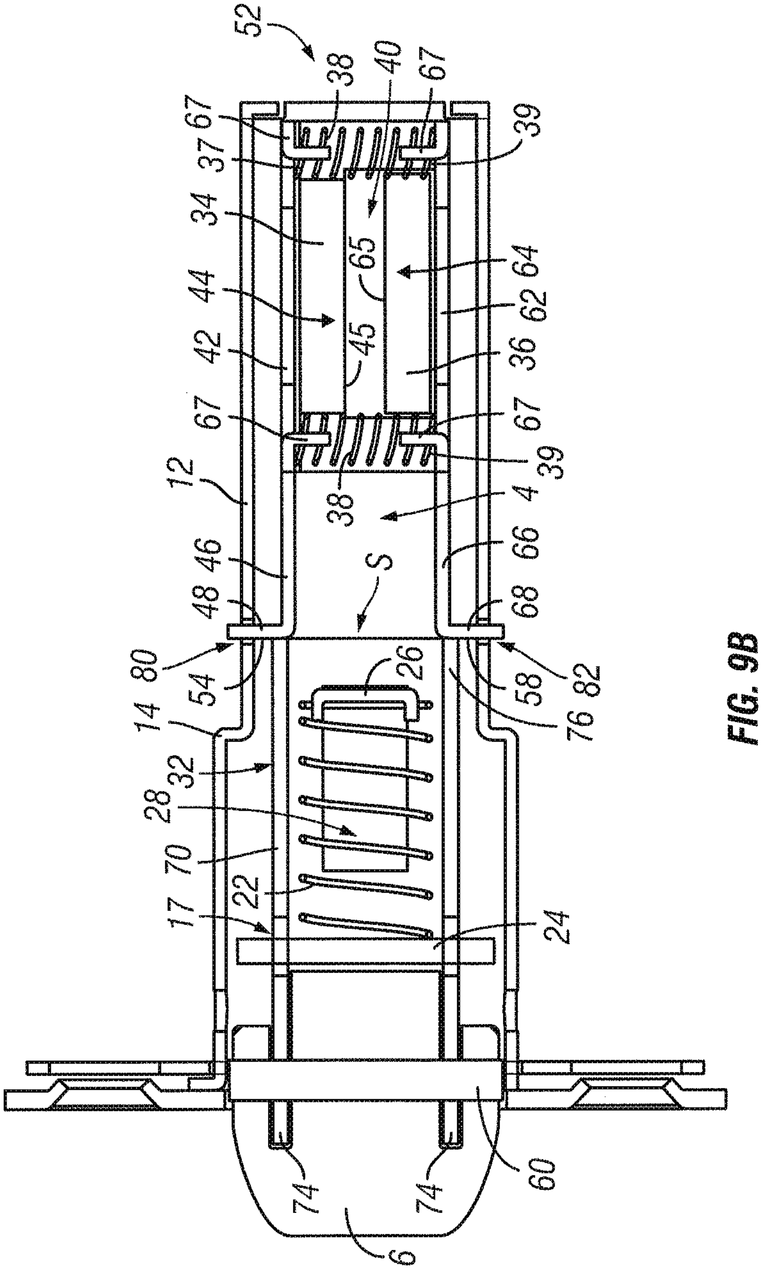
FIG. 9B is an alternative cross-sectional view of the latch assembly of FIG. 1 illustrating a side cross-sectional view of the latch assembly in a similar position as in FIG. 9A but at a 90 degree angle thereto, illustrating that the dead lock cartridge has been retracted away from the one or more locking bars of the dead locking assembly and the one or more locking bars have been biased back toward each other to cause the spindle gap to be minimized again.

FIGS. 9A-9B illustrate the latch assembly 10 after the bolt 6 has been received within a strike box of a doorjamb. Once the bolt 6 passes the doorjamb or strike plate (which would force the bolt 6 momentarily inside the housing 14 again, similar to what was described above when opening the door), the bolt 6 will no longer have a force J upon it, and will move toward the extended position E in light of the biasing force from the bias member 22. As illustrated in FIG. 9B, movement of the bolt 6 to the extended position E will cause the blocking cartridge 32 to return to its original position closer to the first end 50 of the housing 14. Accordingly, the blocking cartridge 32 will slide toward the first end 50 along the longitudinal axis A within the space S until the second end 76 of the blocking cartridge 32 clears the extension arms 46, 66 of the locking bars 34, 36. When the second end 76 clears the extension arms 46 and 66, there will be no additional structure keeping the extension arms 46, 66 spaced further apart from each other. The biasing members 38 of the dead locking assembly 20 will accordingly force the locking bars 34, 36 and the extension arms 46, 66 closer together, and bring the arm tabs 48, 68 back through the tab apertures 80, 82, respectively. When this occurs, the second end 76 of the blocking cartridge 32 will again abut against the abutment surfaces 54, 58 of the arm tabs 48, 68, effectively blocking inward movement of the blocking cartridge 32 and bolt 6. At this point, the dead locking assembly 20 is effectively reset and cannot be disengaged until a user turns the spindle 2 extending through the spindle gap 40 to force the locking bars 34 and 36 further apart with the upward and downward forces U and D, as described herein.

Figure 11B:
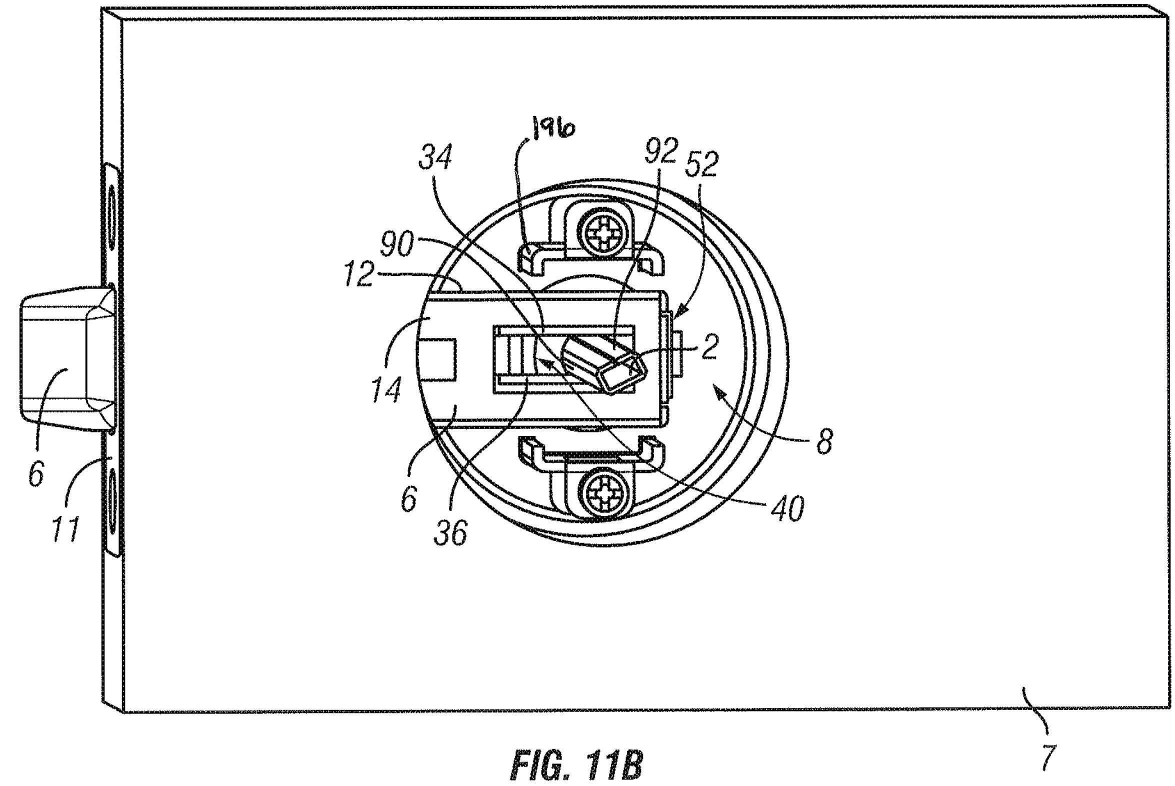
FIG. 11B is a side perspective view of the latch assembly in the door opening similar to FIG. 11A, illustrating the spindle after it has been rotated from the neutral state by rotational force applied to the door knob, the rotation of the spindle causing the one or more locking bars to be pushed away from each other to widen the spindle gap.
Figure 12:
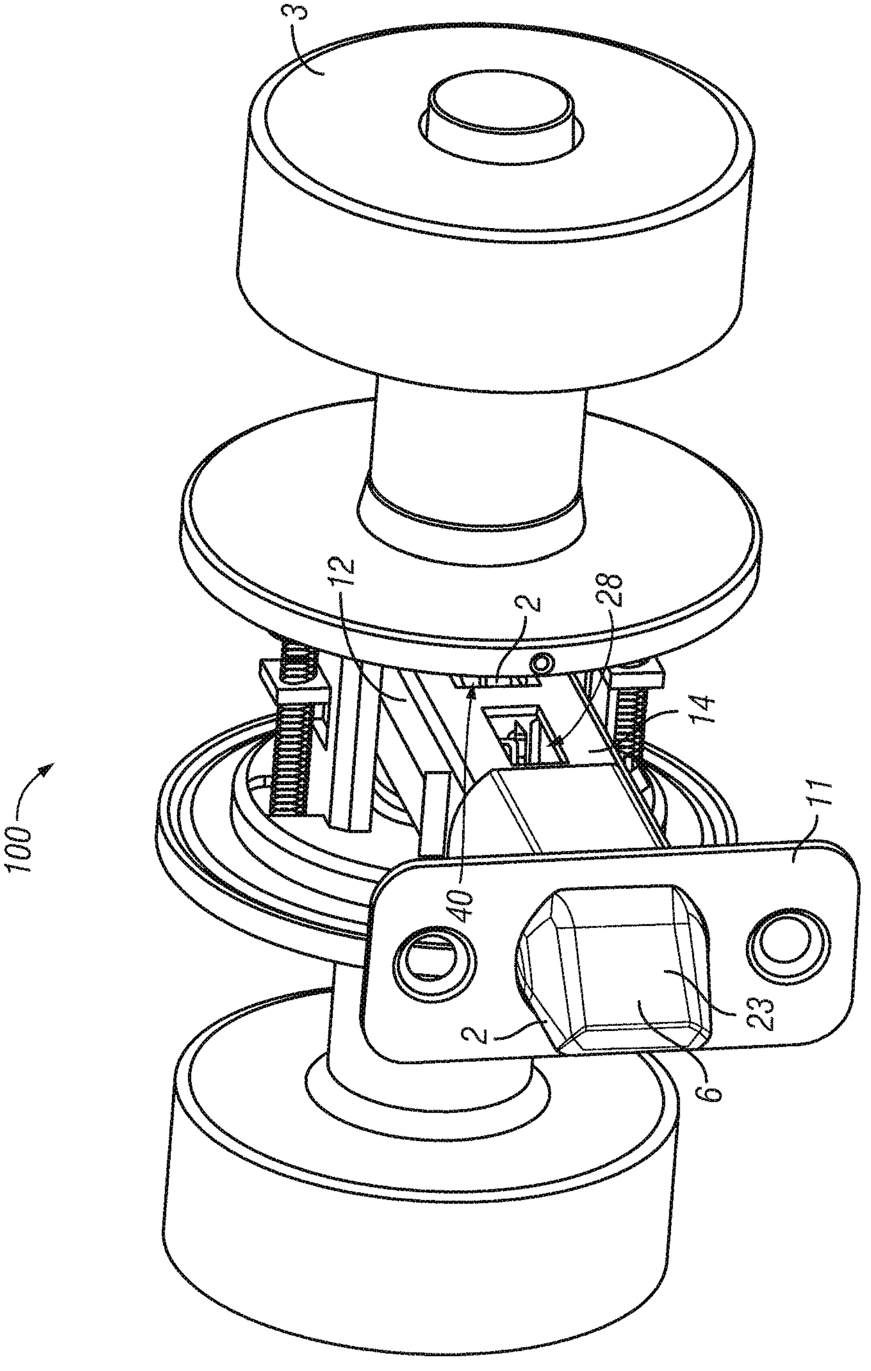
FIG. 12 is an assembly view of a door knob assembly including the latch assembly of FIG. 1.

As illustrated in FIGS. 10-12, the spindle 2 may be formed of a rectangular shape such that a cross-section of the spindle includes two shorter walls 90 and two longer walls 92. The spindle 2 may be maintained in a natural state within the spindle gap 40 where the shorter walls 90 extend between the locking bars 34, 36, but rotation of the spindle 2 causes the longer walls 92 to at least partially extend between the locking bars 34, 36, forcing the locking bars 34, 36 to be spaced further away from each other than in the natural spindle position, as described herein. Other forms of a spindle 2 that cause the locking bars 34, 36 to be positioned further away from each other after rotation of the spindle 2 are envisioned herein.

Figure 14:
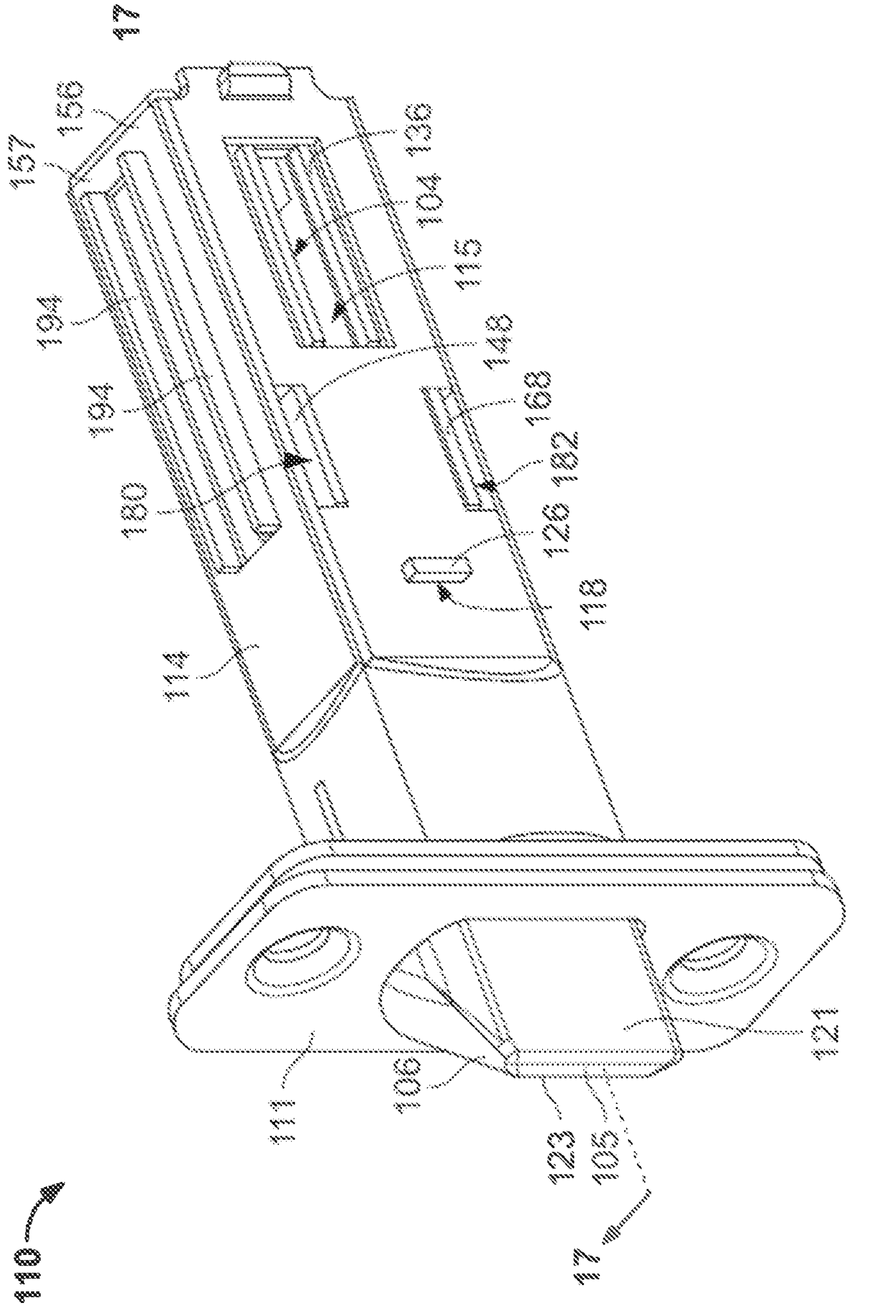
FIG. 14 is a side perspective view of a latch assembly according to an alternative embodiment of the disclosure.
Figure 21A:
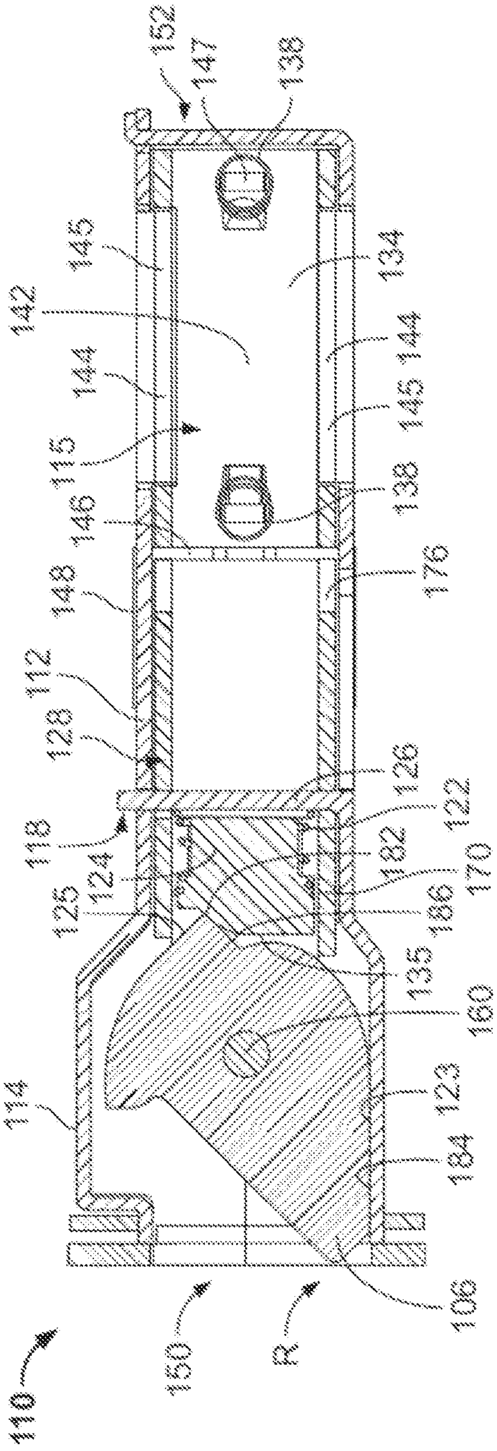
FIG. 21A is a cross-section section of the latch assembly of FIG. 14 taken along line 17-17, illustrating a top down cross-sectional view of the latch assembly after the bolt has been fully retracted into the latch assembly to permit the bolt to pass the strike box.
Figure 21B:
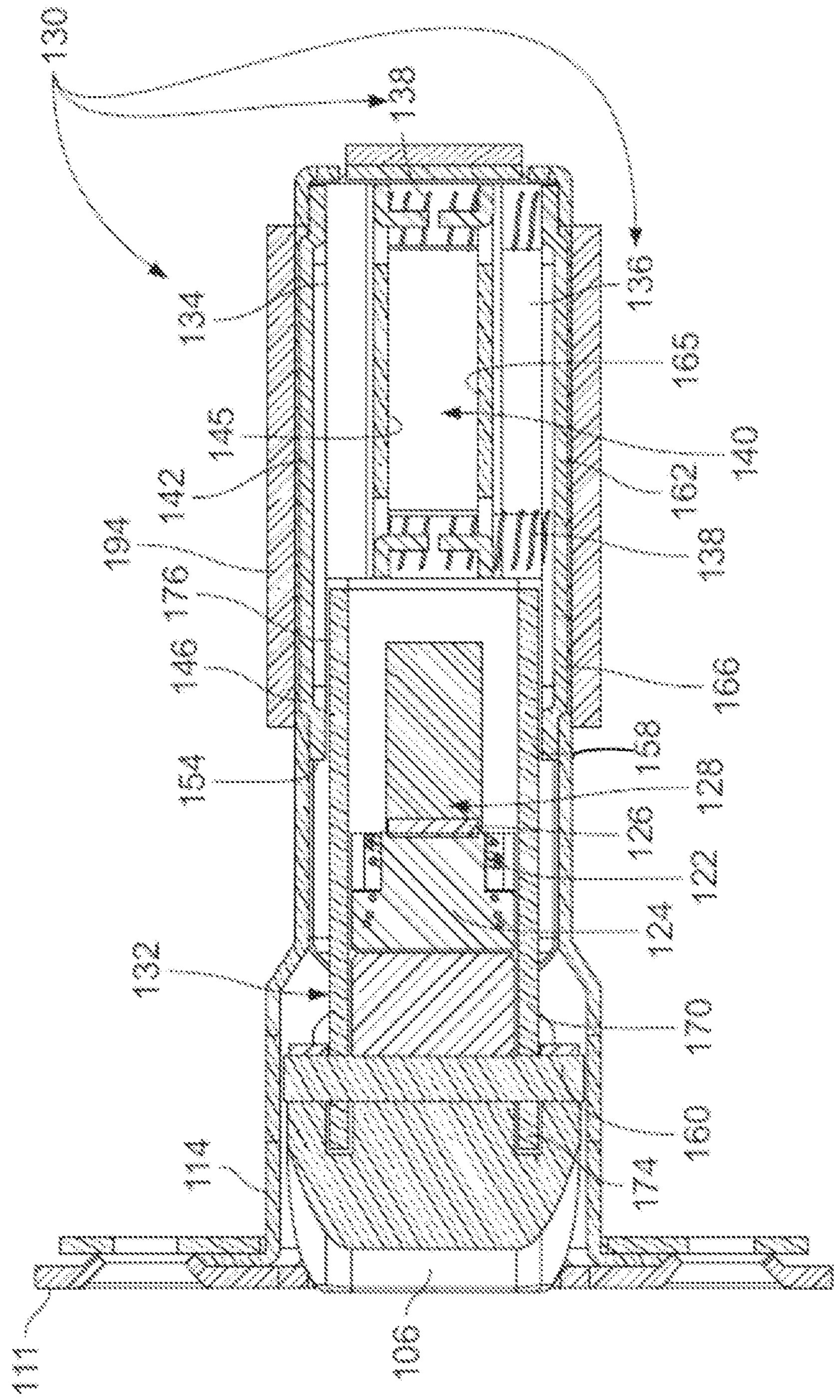
FIG. 21B is an alternative cross-sectional view of the latch assembly of FIG. 14 illustrating a side cross-sectional view of the latch assembly in a similar position as in FIG. 21A but at a 90 degree angle thereto, and further illustrating that the one or more locking bars no longer prevent the dead lock cartridge of the dead locking assembly from moving inward to permit inward movement of the bolt.

FIG. 14 illustrates an example latch assembly 110 according to an alternative embodiment of this disclosure. The latch assembly 110 typically includes similar components as the latch assembly 10 disclosed above and illustrated in FIG. 1 that will typically be numbered in a corresponding manner herein. However, the latch assembly 110 also includes different components or modifications to components as those described above, as will be detailed further below. In an exemplary embodiment, the latch assembly 110 includes a bolt 106 that rotates and/or moves between an extended position (as shown in FIG. 14) in which the bolt 106 extends from a face plate 111 and a retracted position (see FIGS. 21A-B) in which an outer tip or end 105 of the bolt 106 is positioned to be approximately flush with the face plate 111. In the extended position, the bolt 106 is received in a strike plate or strike pocket (not shown) of a door frame and is blocked from pivoting and/or moving inward to keep the door in a closed position. Accordingly, the latch assembly 110 is in a latched position. Upon rotation of a door knob, the bolt 106 is unblocked and freely pivots and moves inward upon pushing/pulling of the door to be opened (via, for example, force upon the bolt from the strike plate).

The latch assembly 110 is typically actuated by rotating a door handle, which could be a door knob, door lever, or other handle device. Unlike existing latch assemblies, however, the door handle of an illustrative embodiment is not directly used to pivot or move the bolt inward, but rather is used to block or unblock movement of the bolt 106 via a dead locking assembly 120 within a cavity 104 of the latch assembly 110. The dead locking assembly 120 is movable from a locked position, which prevents the bolt 106 from moving inward or pivoting into the cavity 104 of the latch assembly 110, to an open position, which allows the bolt 106 to freely pivot and move to the retracted position within the cavity 104 upon pushing/pulling the door and permitting the strike box to apply a force to the bolt 106.

Accordingly, the latch assembly 110 operates differently in this embodiment than a direct mechanical push/pull translation to extend/retract the bolt. 106. Embodiments are also contemplated in which latch assembly 110 could be employed in an electronic lock in which the latch assembly 110 may be actuated with a motor or other electronically-controlled mechanism to move the dead locking assembly 120 from the locked to the open position. In various examples, there may be an exterior door handle and an interior door handle that could each actuate the latch assembly 110 to operate the dead locking assembly 120 to allow opening of the door.

In various embodiments, the bolt 106 includes an angled surface 123 that slopes toward an exterior surface of the door and a straight surface 121 that is positioned toward an interior surface of the door. When the door is being closed, the angled surface 123 acts as a cam with the doorjamb or strike plate (not shown) to move the bolt 106 within the latch assembly 110 so that the bolt 106 can pass by the door plate and enter the strike box to retain the door in the closed position. Accordingly, the strike plate applies a force upon the bolt 106 via the angled surface 123 during closing.

The straight surface 121 prevents the door from being opened inward (after the door is closed) without rotation and/or inward movement of the bolt 106 (which is permitted when the dead locking assembly 120 does not block the bolt 106), as the straight surface 121 will abut against an inner portion of the strike box when the bolt 106 is retained therein. The bolt 106 may further be formed to include a pivot aperture 113 through which a pivot pin 160 extends, with the bolt 106 rotating about pivot pin 160 and the pivot pin 160 connecting the bolt 106 to the rest of the latch assembly 110. The bolt 106 further includes one or more engagement surfaces 125 that is generally opposite the end of the bolt 106 and configured to be maintained within the cavity 104. The engagement surface 125 is configured to be engaged by other components to apply an outward force onto the bolt 106 to cause it to be in the extended position, as will be understood from the disclosure herein. The bolt 106 may further include a fin 109 that is configured to abut against a shoulder portion 188 of a housing 114 of the latch assembly 110 to prevent the bolt 106 from sliding completely out of the housing 114.

Figure 17:
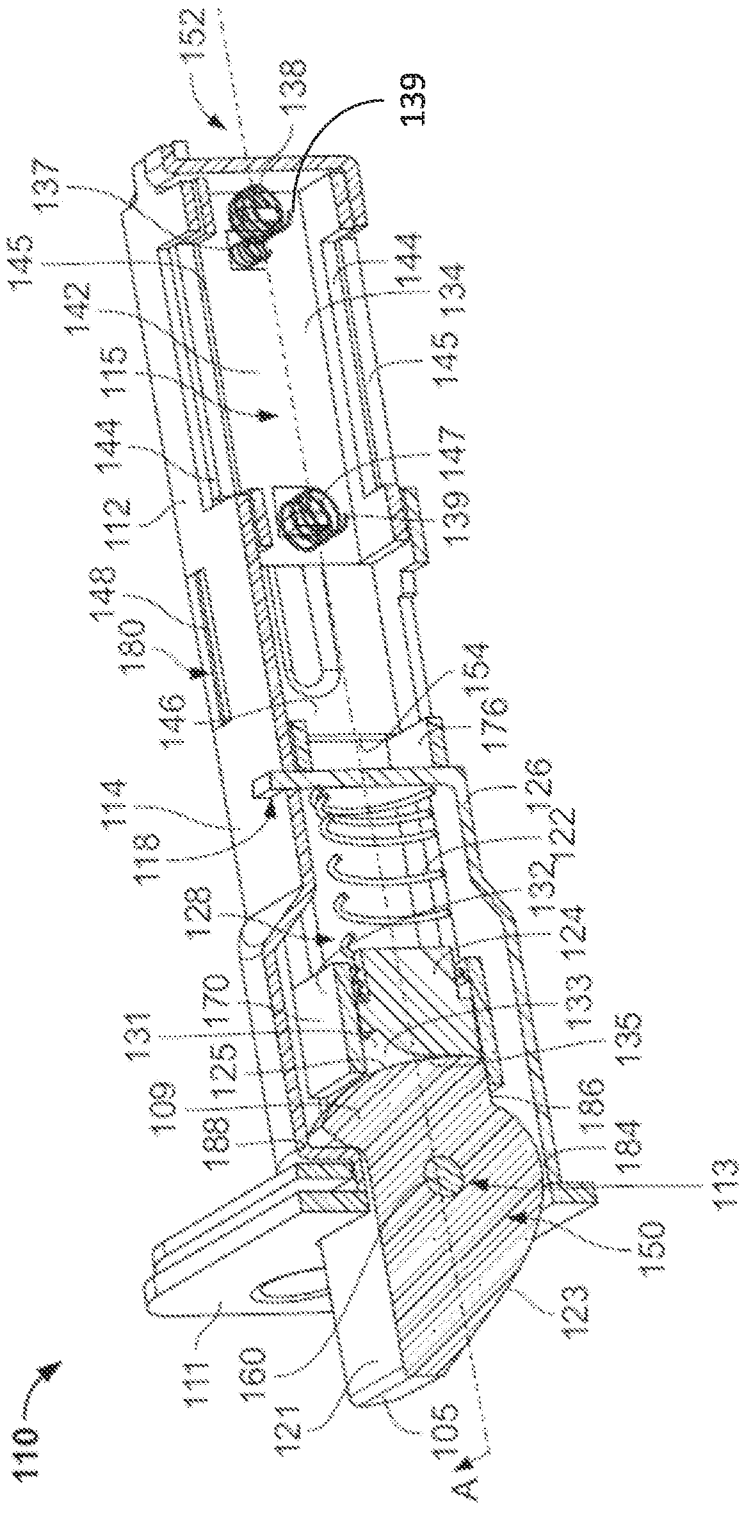
FIG. 17 is a perspective cross-sectional view perspective view of the latch assembly of FIG. 14 taken along the line 17-17.

FIG. 17 illustrates a cross-section of the latch assembly 110 of FIG. 14 prior to installation in the door. The cross-sectional view of FIG. 17 is taken along line 17-17 of FIG. 14 and illustrates a cross-section of the latch assembly 110 that is along a horizontal plane that intersects the door substantially perpendicular to the exterior and interior surfaces of the door. As shown, the latch assembly 110 includes the external housing or sleeve 114 that is configured to be received within an aperture of the door. Specifically, when the latch assembly 110 is installed, the housing 114 is primarily disposed in a cross bore in the door. As shown, the housing 114 has an open first end 150 and a second end 152 that is configured to be received within the cross bore. The housing 114 substantially extends along the longitudinal axis A, as illustrated in FIG. 17. The housing 114 includes an annular wall 112 that extends between the first end 150 and the second end 152 along the longitudinal axis A, the annular wall 112 defining the cavity 104 of the housing 114. The bolt 106 extends out of the open first end 150 in its extended position (as shown in FIG. 17) and may be blocked from pivoting into the cavity 104 to keep the door closed as discussed below. When a user wants to open the door, rotating the door handle unblocks the bolt 106 as described below so it can freely pivot and move to a retracted position inside the cavity 104 of the housing 114 as the door is pushed/pulled.

In various embodiments, the annular wall 112 of the housing 114 includes two opposite wall surfaces 156, 157 that define a bore 115 through the housing 114 which includes a torque blade or spindle (not shown) connected to the door handle 3 that can extend to actuate the latch assembly 110, similar to the operation described above regarding the embodiment of FIG. 1. Specifically, the spindle can rotate with rotation of the door handle to actuate or disengage the dead locking assembly 120 to permit the bolt 106 to move from the extended position to the retracted position. In the example shown, the bore 115 of the housing 114 is coaxial with the cross bore of the door to receive the torque blade of the door handle that can be used to disengage the dead locking assembly 120. In various embodiments, it is within the scope of this disclosure that the housing 114 may be comprised of multiple components that are slidably coupled together to adjust a backset of the latch assembly 110 within the door.

Referring again to FIG. 17, the latch assembly 110 includes the bolt 106 that is pivotable and movable within the cavity 104 of the housing 114 and the dead locking assembly 120. In the example shown, the bolt 106 is pivotally connected to a portion of the dead locking assembly 120. The bolt 106 is configured to pivot about a pivot pin 160 as it moves between its extended and retracted positions when the door is opened. Further, both the bolt 106 and the dead locking assembly 120 are movable within the cavity 104 of the housing 114 to move the bolt 106 into and out of the open end 150 of the housing 114 when moving to the bolt between positions. As illustrated, for example, in FIG. 18A, FIG. 20, and FIG. 21A, the bolt 106 moves from a fully extended position E, to a partially extended position P, to a fully retracted position R as it pivots about the pivot pin 160 and moves further into the cavity 104 of the housing 114. The bolt 106 moves through these positions when a force is applied to the straight surface 121 of the bolt 106 from an internal surface of the strike box and when the dead locking assembly 120 does not block the bolt 106 from moving inward into the cavity 104.

As illustrated in FIG. 17, the latch assembly 110 further comprises a bias member 122, which may be in the form a spring. The bias member 122 is configured to bias the bolt 106 out of the open end 150 of the housing 114 to the extended position E. For example, the bias member 122 may include a first end 129 that is configured to abut against a portion of the engagement surface 125 of the bolt 106 and a second end 127 that is configured to abut against a bias stop 126 of the latch assembly 110.

Figure 15:
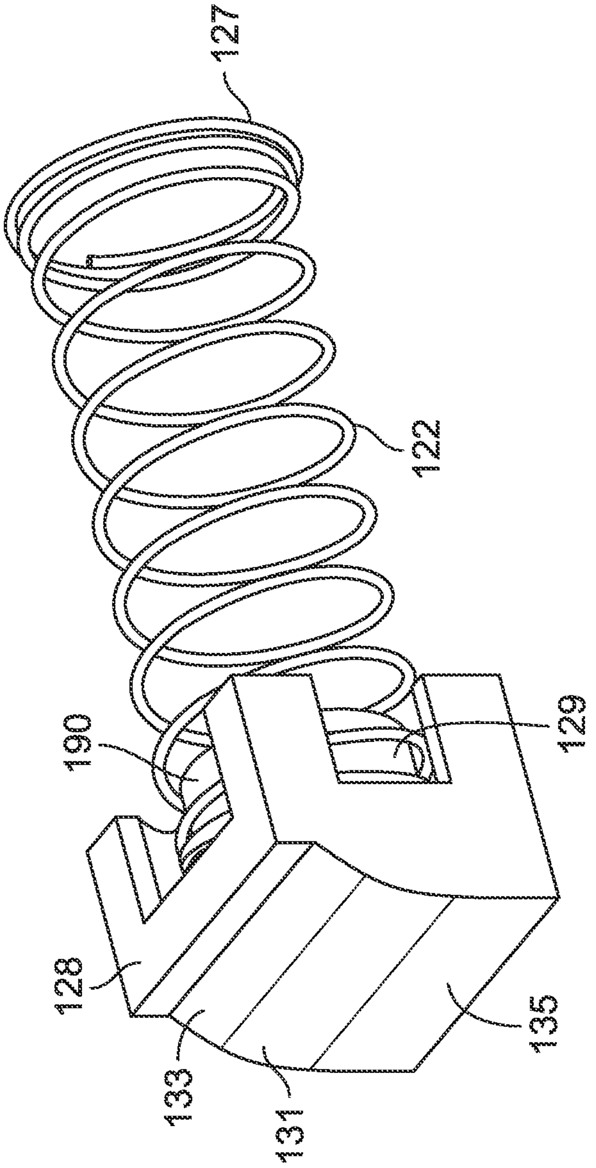
FIG. 15 is a side perspective view of a half-way stop of the latch assembly of FIG. 14.

In other embodiments, the first end 129 of the bias member may engage with a half-way stop 124 that, in turn, abuts against a portion of the bolt 106 to apply a force to the bolt 106, as described below and illustrated in FIGS. 14-15. In various embodiments, the bias stop 126 may be integrally formed with a portion of the housing 114 of the latch assembly 110, although other embodiments are envisioned herein. The bias stop 126 may substantially be a fixed point along the longitudinal axis A of the housing 114 upon which the bias member 122 abuts in order to provide a bias force upon the bolt 106. When the door is being closed, the angled surface 123 of the bolt 106 acts as a cam with the strike plate or doorjamb to overcome the urging of the bias member 122 to move the bolt 106 toward the retracted position R. When the door closes, the bolt 106 will align with an opening in the strike box and the bias member 122 will urge the bolt 106 back into its extended position E. Accordingly, the bolt 106 is urged toward its extended position by the urging of the bias member 122 when no other forces act upon the bolt 106.

The dead locking assembly 120 will now be described. As illustrated in FIGS. 17-18B, the dead locking assembly 120 includes a locking bar assembly 130 and a blocking cartridge 132 that are received within the cavity 104 of the housing 114. The locking bar assembly 130 and blocking cartridge 132 are configured to engage with each other to block or unblock movement of the bolt 106 into and out of the housing 114.

In particular, the locking bar assembly 130 is configured to block inward movement of the blocking cartridge 132 in a blocking state to prevent movement of the blocking cartridge 132 toward the locking bar assembly 130, which in turn will prevent inward movement of the bolt 106. The locking bar assembly 130 is engageable by the spindle to move to an unblocking state that permits inward movement of the blocking cartridge 132 toward the locking bar assembly 130, thereby unblocking inward movement of the bolt 106.

Figure 18A:
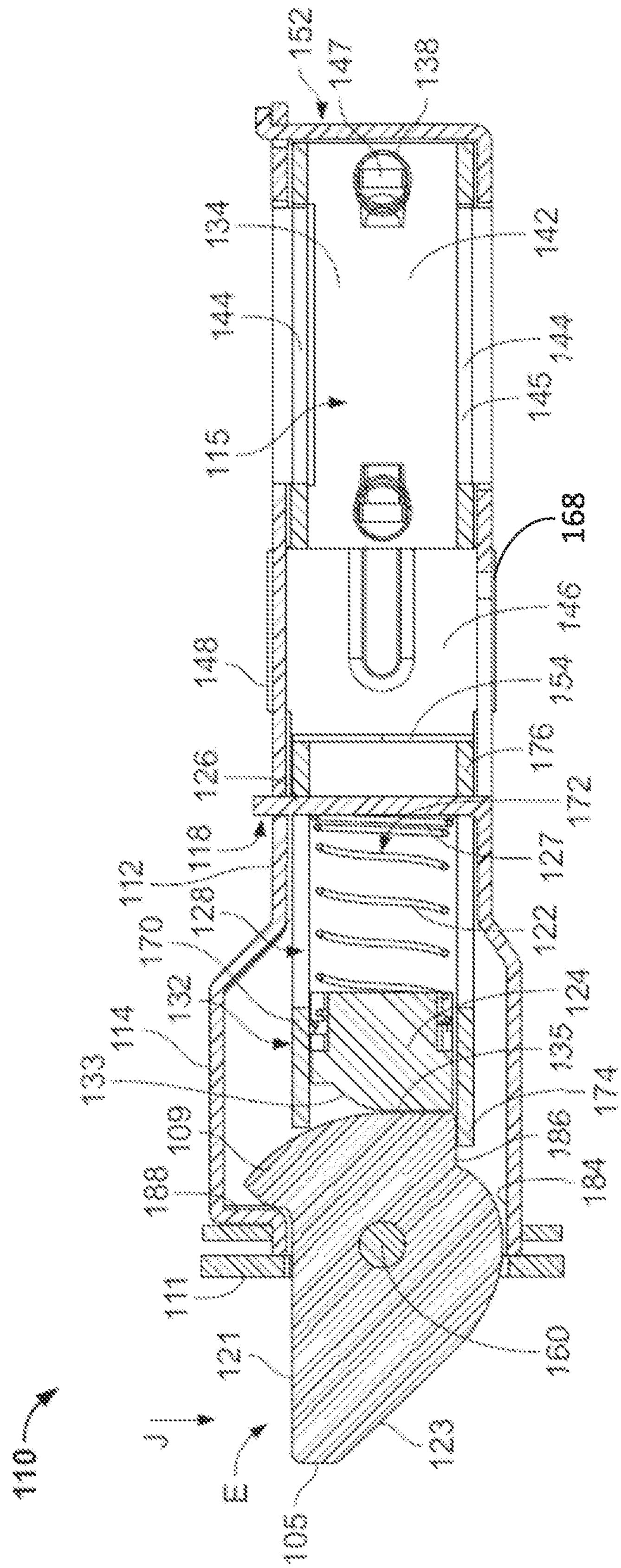
FIG. 18A is a cross-section of the latch assembly of FIG. 14 taken along line 17-17, illustrating a top down cross-sectional view of the latch assembly in an extended and locked state wherein a bolt of the latch assembly is prevented from moving inward by a dead locking assembly within the latch assembly.
Figure 18B:
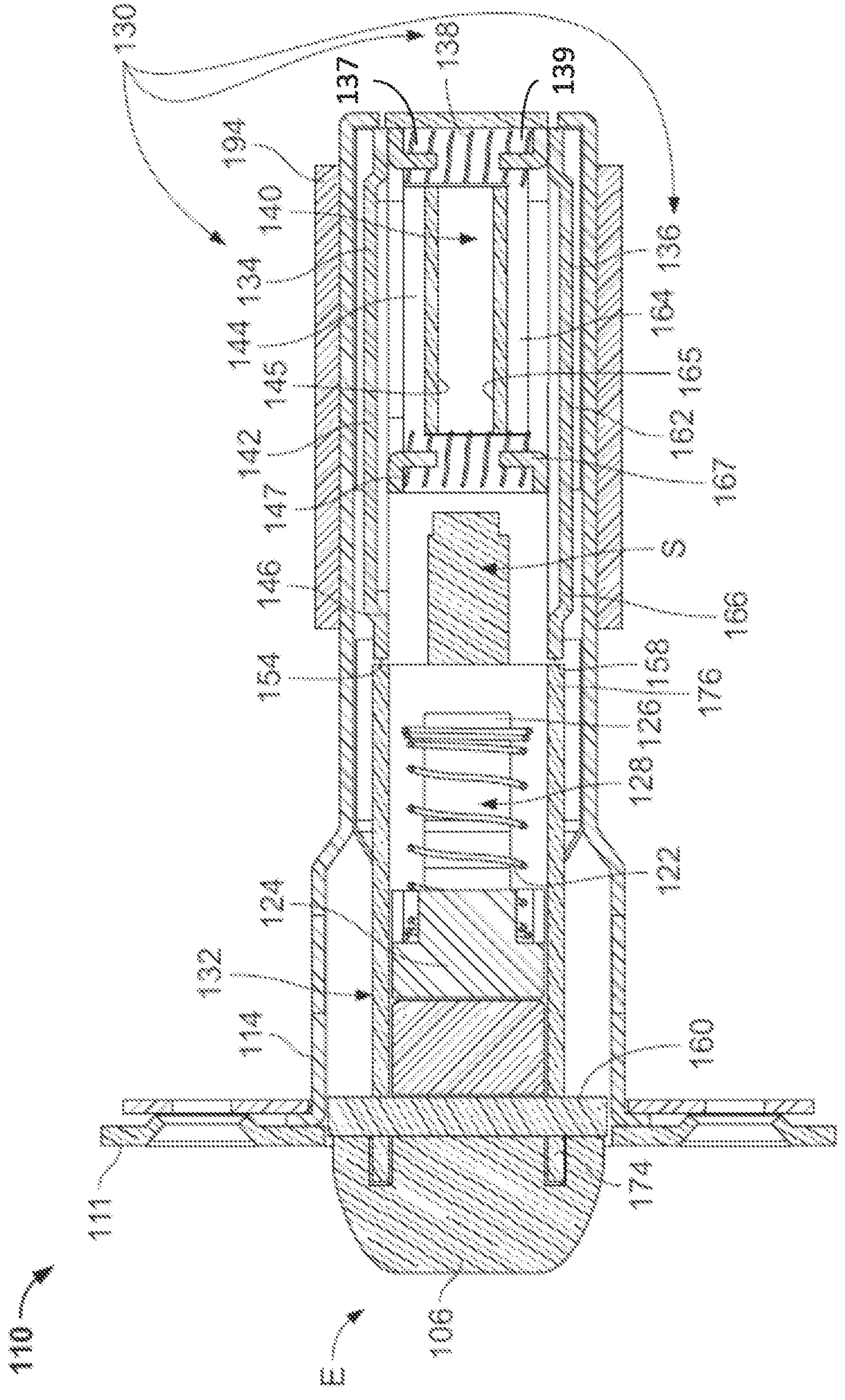
FIG. 18B is a an alternative cross-sectional view of the latch assembly of FIG. 14, illustrating a side cross-sectional view of the latch assembly in a similar position as in FIG. 18A but at a 90 degree angle thereto, the latch assembly including a spindle gap in the dead locking assembly that is small or minimized, and the dead locking assembly including one or more locking bars that prevent inward movement of a dead latch cartridge, thereby preventing inward movement of the bolt.

As illustrated in FIGS. 18A-18B, the locking bar assembly 130 includes a first locking bar 134, a second locking bar 136, and one or more biasing members 138 that extend between the first and second locking bars 134, 136. The locking bars 134.136 are spaced away from each other to form a spindle gap 140 therebetween. The biasing members 138 are configured to retain the locking bars 134, 136 in a closer or nearly closed position wherein the spindle gap 140 is small, as illustrated in FIG. 18B, but the locking bars 134, 136 are movable to an open position where the locking bars 134, 136 are spaced away from each other to expand the spindle gap 140 to be larger. In various embodiments, however, the locking bar assembly 130 may only include a first locking bar 134 and a biasing member 138 that biases the first locking bar 134 into a position closer to the longitudinal axis A, with the first locking bar 134 movable away from the longitudinal axis by rotation of the spindle, as one of skill would understand from further description below.

Figure 16B:
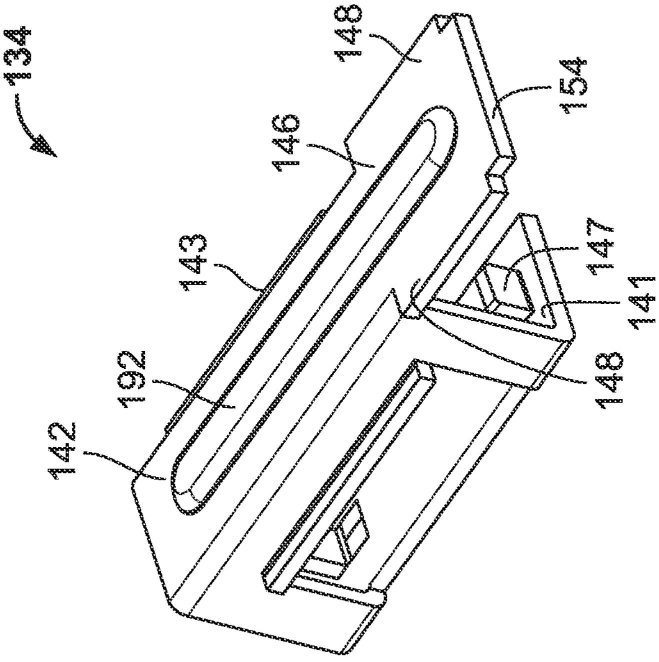
FIGS. 16A and 16B are front and back perspective views of a locking bar of the latch assembly of FIG. 14.
Figure 16A:
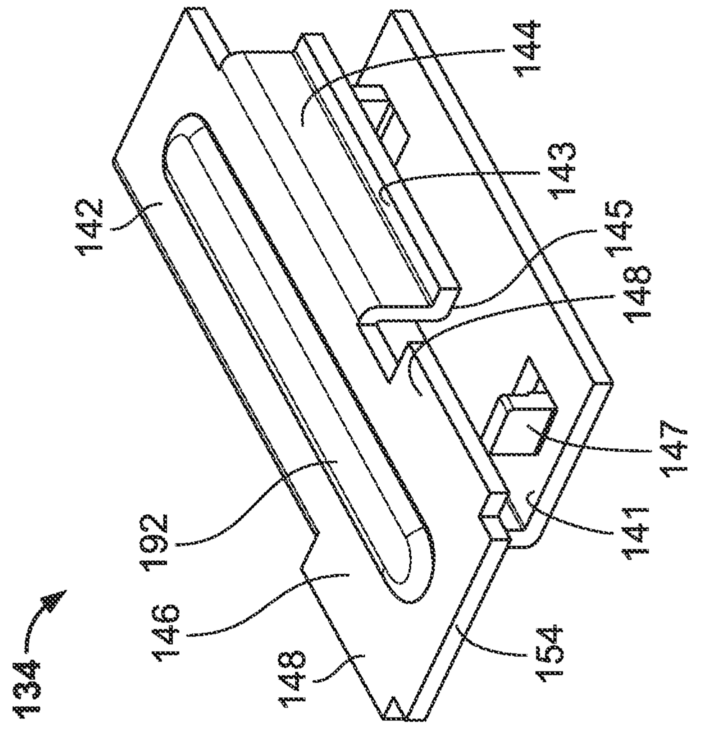

An illustrative embodiment of the locking bars 134, 136 will now be described. However, other forms of locking bars 134, 136 are envisioned within the scope of this disclosure. Further, as described herein, the locking bars 134, 136 may have similar or identical components, or they may be comprised of different components. The locking bars 134, 136 may be mirror images of each other, or the locking bar 134 may include additional components that are not included in the locking bar 136. Regardless of the design, the locking bars 134, 136 are configured to work together to block or unblock movement of the blocking cartridge 132 as described herein. An illustrative example of the locking bar 134 is shown in FIGS. 16A-16B.

As illustrated in FIGS. 18A-18B and 16A-16B, the locking bar 134 illustratively includes a bar base 142 configured to extend along the longitudinal axis A of the housing 114, one or more engagement tabs 144 configured to extend substantially perpendicular to the bar base 142, and an extension arm 146 configured to be substantially planar with the base 142. In this embodiment, there may be no arm tabs (e.g., 48) that extend from the extension arm 146. The engagement tabs 144 include an engagement surface 145 which partially define the spindle gap 140 and are configured to abut against the spindle 2 that is rotated by the handle 3 when a user operates the latch assembly 110, and an extension arm 143. Accordingly, the engagement tabs 144 may extend into the bore 115 and be coaxial with the bore 115 so as to be engaged by the spindle when it is received through the bore 115.

Similarly, the locking bar 136 illustratively includes a bar base 162 configured to extend along the longitudinal axis A of the housing 114, one or more engagement tabs 164 configured to extend substantially perpendicular to the bar base 162, and an extension arm 166 configured to be substantially planar with the base 162. In this embodiment, there may be no arm tabs (e.g., 68) that extend from the extension arm 166. The engagement tabs 164 include an engagement surface 165 which partially define the spindle gap 140 and are configured to abut against the spindle that is rotated by the handle when a user operates the latch assembly 110. Accordingly, the engagement tabs 164 may extend into the bore 115 and be coaxial with the bore 115 so as to be engaged by the spindle when it is received through the bore 115. As illustrated in FIG. 18B, the engagement tabs 144, 164 and their respective engagement surfaces 145 and 165 are configured to define the spindle gap 140 therebetween. In various embodiments, and as illustrated in FIG. 16A, an engagement lip 43 may extend from the engagement surface 145 to provide further contact surface between the spindle and the locking bar 134.

In illustrative embodiments, the one or more biasing members 138 are retained between the bar bases 142, 162 of the locking bars 134, 136 and are configured to bias the locking bars 134, 136 toward each other to narrow or close the spindle gap 140 between the engagement tabs 144, 164. The biasing members 138 may illustratively be a helical spring that is coupled to the locking bars 134, 136 and pulls the locking bars 134, 136 toward each other, although other embodiments are envisioned herein. In certain embodiments, the biasing members 138 may be oriented or partially retained in connection with the locking bars 134, 136 by one or more spring retainers 147 on the locking bar 134 and one or more spring retainers 167 on the locking bar 136. For example, the spring retainers 147 may be coupled to a connector arm 141 of the locking bar 134 that extends from the bar base 142, as illustrated in FIGS. 18A-18B. In illustrative embodiments, the spring retainers 147, 167 may be coupled to the bar bases 142, 162 to move therewith and may extend substantially perpendicular to the bar bases 142, 162 to be received within opposite ends 137, 139 of the biasing member 138, as illustrated, for example, in FIGS. 17 and 18B. The biasing member 138 may be a tension spring that naturally biases the ends 137, 139 close together, thereby biasing the locking bars 134, 136 close together, as is understood by one skilled in the art.

As illustrated in FIGS. 18A and 18B, the extension arms 146 and 166 are configured to extend parallel to the longitudinal axis A within the cavity 104 of the housing 114 toward the blocking cartridge 132. The extension arms 146, 166 themselves provide abutment surfaces 154, 158, respectively, upon which a portion of the blocking cartridge 132 abuts to block inward movement of the blocking cartridge 132 along the longitudinal axis A.

In various embodiments, the abutment surfaces 154, 158 may be include a flat surface, as illustrated in FIGS. 16A-16B upon which the blocking cartridge may abut, or may be configured to have a round, sharp, or angled shape, although other embodiments are envisioned herein. The extension arms 146, 166 are configured to move generally perpendicular to, and away from, the longitudinal axis A when the locking bars 134, 136 are moved away from each other to widen the spindle gap 140 when the spindle is rotated, which widens a space S between the extension arms 146, 166. When the distance between the extension arms 146, 166 is widened, the blocking cartridge 132 no longer abuts against abutment surfaces 154, 158, permitting the blocking cartridge 132 to move inward within the space S.

In illustrative embodiments, the blocking cartridge 132 includes an annular housing 170 that is configured to be slidable within the cavity 104 toward and away from the locking bar assembly 130. The annular housing 170 defines a bias cavity 172 through the blocking cartridge 132 that is generally aligned with the longitudinal axis A of the housing 114. In various embodiments, the bias member 122 extends within the bias cavity 172 to abut against the bolt 106 or the half-way stop 124. The annular housing 170 of the blocking cartridge 132 includes a first end 174 and a second end 176 that substantially define the ends of the housing 170. The first end 174 is configured to be coupled to or abut against a portion of the bolt 106 and the second end 176 is configured to abut against the abutment surfaces 154, 158 of the extension arms 146, 166 of the locking bars 134, 136, as illustrated in FIG. 18B. When the second end 176 abuts against the extension arms 146, 166, inward movement of the blocking cartridge 132 is prevented, which further prevents inward rotation and/or movement of the bolt 106 from the extended position E. In various embodiments, the blocking cartridge 132 further includes a bias stop aperture 128 that permits the blocking cartridge 132 to move around the bias stop 126 as the blocking cartridge 132 moves inward. The bias stop 126 may be retained in a fixed position relative to the housing 114 by extending through one or more stop retainment apertures 18 that extend through the housing 114 as the blocking cartridge 132 moves within the housing 114.

In illustrative embodiments, the latch assembly 110 further comprises the half way stop 124 that extends through a portion of the blocking cartridge 132 and is configured to abut against the engagement surface 125 of the bolt 106 to retain the bolt 106 in a position where the bolt 106 partially extends out of the open first end 150. As illustrated in FIGS. 18A-18B, the half way stop 124 may be configured to extend within the inner circumference of the biasing member 122. In various embodiments, the half way stop 124 may be prevented from substantial movement longitudinally with respect to the blocking cartridge 132 by one or more stop retainment apertures 117 formed within the housing 170 of the blocking cartridge 132, although in other embodiments, the half way stop 124 may be permitted to move freely along the longitudinal axis A within the blocking cartridge 132. The half way stop 124 may provide a means for retaining the bolt 106 in a half way out position relative to the opening 50 due to the size and shape of the half-way stop 124, its location within the blocking cartridge 132, and the bias force placed upon the half-way stop 124 from the bias member 122.

The half-way stop 124 may be any of a variety of sizes and shapes depending on the particular operation desired, the desired extent to which the bolt 106 protrudes from the end 150 of the housing 114, the amount of force transferred through the bolt 106 to overcome engagement with the half-way stop 124, etc. As illustrated in FIG. 15, the half-way stop may be configured with an engaging face 131 that includes a sloped or curved portion 133 adjacent the top of the face 131 and a flatter portion 135 adjacent the bottom of the face 131. The curved portion 133 is configured to provide a stop surface upon which a catch surface 186 of the bolt 106 rests when the bolt 106 is in a half-way out position, thereby preventing rotation of the bolt 106 to move the bolt 106 to the fully extended position E. As force J is applied to the bolt 106 from the doorjamb as described herein, the catch surface 186 of the bolt 106 ramps along the curved portion 133 until an edge 187 of the catch surface 186 engages with the flatter portion 135 of the engaging face 131, permitting the engagement surface 125 to slide along the flatter portion 135 and the bolt 106 to further rotate to the fully extended position E, as understood by a person of skill and illustrated in FIGS. 17-24B.

Other configurations of the engaging face 131 are envisioned herein as well. In illustrative embodiments, the half-way stop 124 may further include a retaining nub 190 upon which the bias member 122 is secured or retained around to secure the bias member 122 to the half-way stop 124.

An illustrative operation of the latch assembly 110 will now be described. FIGS. 18A-21B illustrate how the latch assembly 110 is operated, and how the dead latch function is deactivated, during operation of opening the door from a latched position. FIGS. 22A-24B illustrate how the latch assembly 110 operates when the door moves from an open position where it is not latched with the doorjamb to a closed position where it is latched to the door jamb and the dead latch function is reactivated.

As illustrated in FIGS. 18A-18B, the bolt 106 is in the fully extended position E when the bolt 106 is received within a strike box of a door and the latch assembly 110 is in the closed position. If a pressure or force J from the doorjamb is applied to the bolt 106 in an unauthorized manner, the dead locking assembly 120 prevents the bolt 106 from rotating or moving inward from the extended position E. In particular, the second end 176 of the blocking cartridge 132 is aligned with and abuts against the abutment surfaces 154, 158 of the locking bars 134, 136, respectively, and the blocking cartridge 132 is prevented from moving longitudinally inward by engagement between the second end 176 of the blocking cartridge 132 and the abutment surfaces 154, 158. As illustrated in FIGS. 18A-18B, the spindle gap 140 between the engagement tabs 144, 164 of the locking bars 134, 136 is smaller, and the engagement tabs 144, 164 are biased toward each other via the biasing members 138, causing arm tabs 148, 168 of the locking bars 134, 136 to be aligned with the second end 176 of the blocking cartridge 132. As the blocking cartridge is affixed against the bolt 106, the bolt 106 is prevented from inward movement, effectively locking the latch assembly 110 in the closed position.

Figure 19:
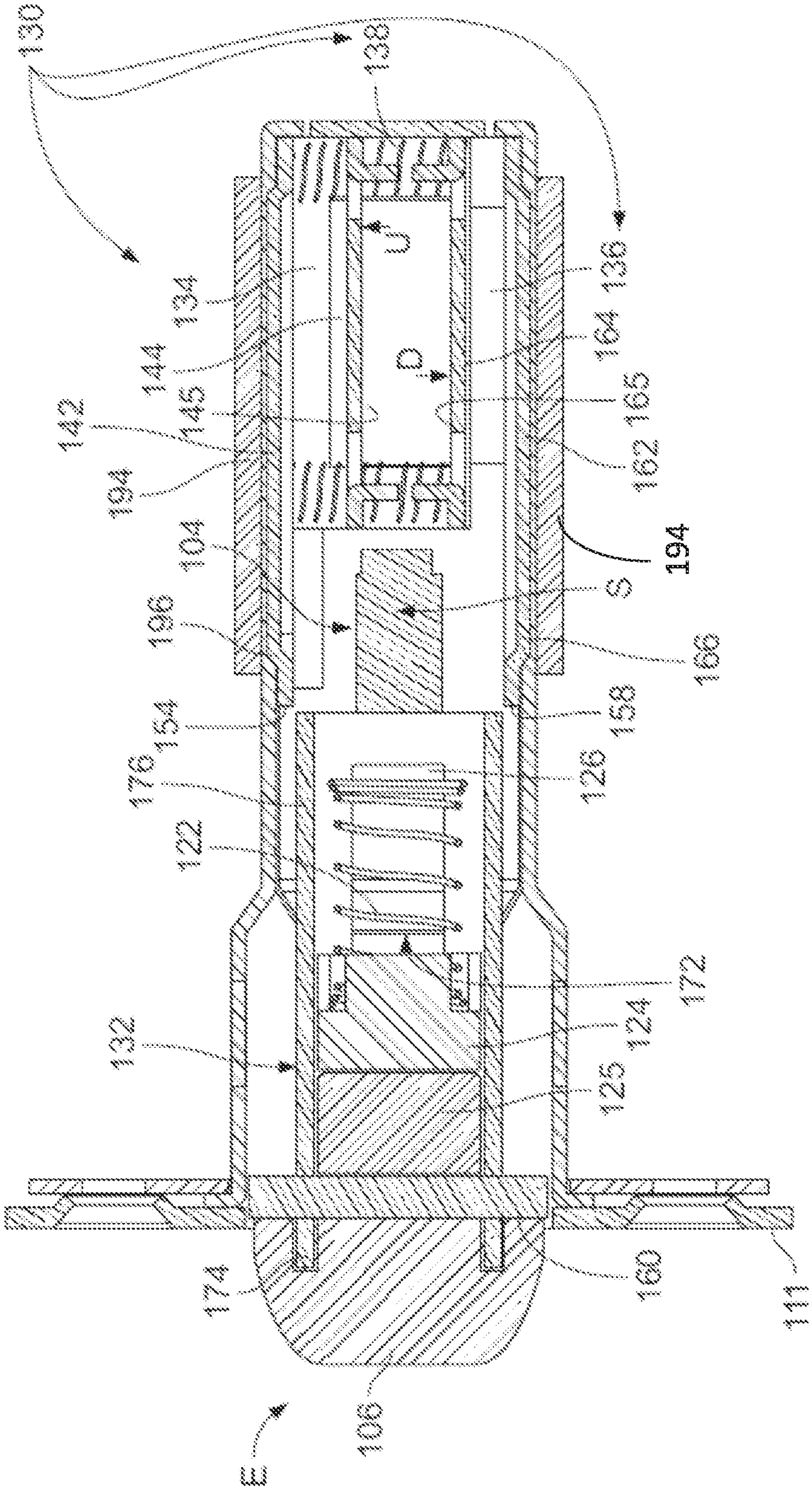
FIG. 19 is a side cross-sectional view of the latch assembly of FIG. 14 similar to FIG. 18B, illustrating that the spindle gap of the dead locking assembly has been widened or increased due to rotation of a spindle from a door knob.

FIG. 19 illustrates operation of the dead locking assembly 120 when a user actuates the handle or knob to turn or rotate the spindle within the spindle gap 140. In illustrative embodiments, the spindle is asymmetrical and turning of the spindle causes the spindle to apply upward pressure U on the engagement tab 144 of the first locking bar 134 and downward pressure or force D on the engagement tab 164 of the second locking bar 136 due to a larger cross-sectional distance of the spindle in the rotated position. These upward and down forces U and D cause the locking bars 134, 136 to move away from each other against the bias of the biasing member 138, expanding the spindle gap 140. Such movement further causes the extension arms 146, 166 to move away from each other.

This widens the space S between the extension arms 146, 166 to a point where the second end 176 of the blocking cartridge 132 no longer abut against the abutment surfaces 154, 158. At this point, the blocking cartridge 132 can move inward along the longitudinal axis A toward the second end 152 of the housing 114 when a force is applied to the bolt 106.

Figure 20:
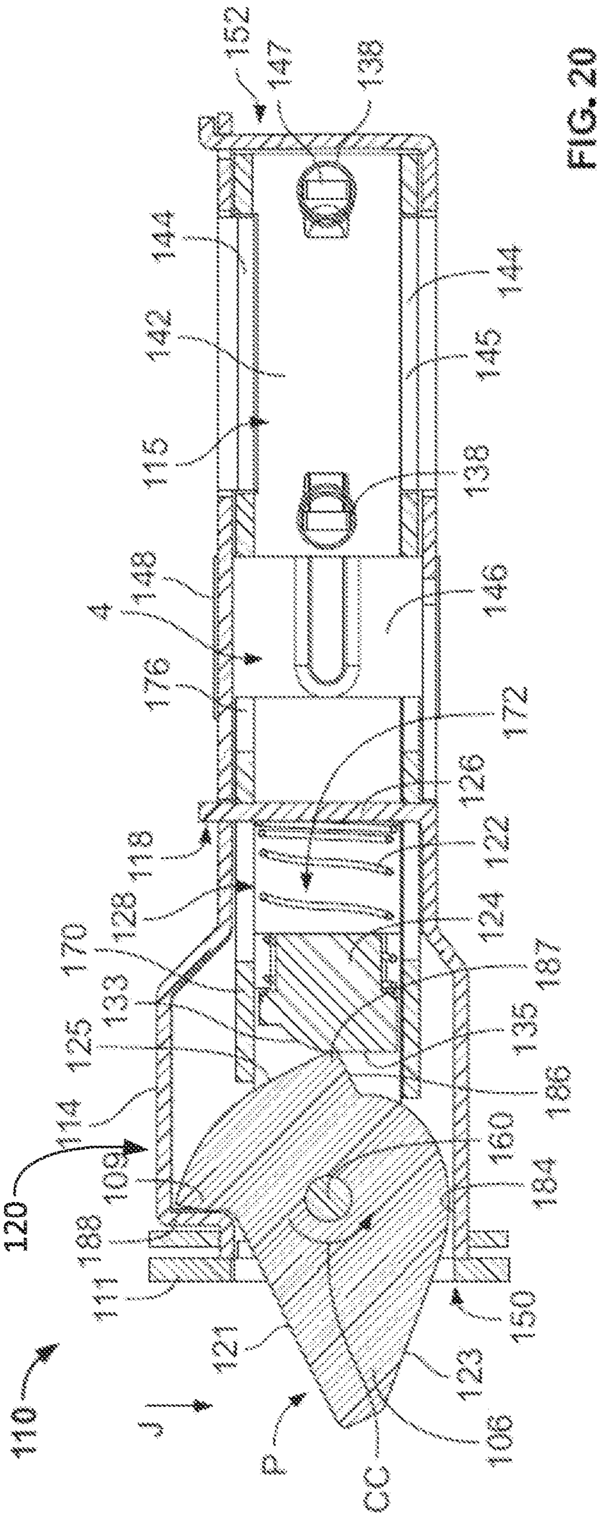
FIG. 20 is a cross-section of the latch assembly of FIG. 14 taken along line 17-17, illustrating a top down cross-sectional view of the latch assembly in the process of moving into a retracted position, wherein a force is applied to the bolt of the latch assembly from the strike box and the bolt is not prevented from moving inward due to application of such force.

FIG. 20 illustrates operation of the latch assembly 110 after the dead locking assembly 120 has been disengaged as illustrated in FIG. 19, in particular, when a force J from a doorjamb or strike box is applied to the bolt 106, the bolt 106 will no longer be prevented from pivoting and moving inward inside the housing 114 by the blocking cartridge 132, as the blocking cartridge 132 itself will be permitted to move inward and slide within the space S between the extension arms 146, 166 of the locking bars 134, 136. The bolt 106 will pivot and move inward against the bias of the bias member 122, which is fixedly secured at the second end 127 of the biasing member against the bias stop 126 that is fixedly maintained relative to the housing 114 by engagement with one or more stop retainment apertures 118. The force J will cause the bolt 106 to rotate in a perpendicular direction CC with respect to the sleeve to a partially retracted position P, and then to a position where the angled surface 123 of the bolt 106 abuts against an inner surface 184 of the housing 114 where the bolt 106 no longer rotates. The force J will continue to push the bolt 106 in an inward direction against the bias of the bias member 122 as the bolt 106 attempts to clear the doorjamb, sliding the blocking cartridge 132 further inward inside the housing 114. When the angled surface 123 of the bolt 106 engages with the inner surface 184, the catch surface 186 on the engagement surface 125 of the bolt 106 mates or frictionally engages with the half way stop 124 to prevent rotation of the bolt 106 in a direction opposite the perpendicular direction CC (e.g., toward the extended position E).

In various embodiments, the half way stop 124 may be provided clearance to move along the longitudinal axis A to permit the catch surface 186 to frictionally engage with the half way stop 124, but will still maintain a bias force against the bolt 106 from the bias member 122 to prevent additional inward movement, as can be understood by a person of skill. The bolt 106 is now effectively blocked from rotating further past the inner surface 184 or back away from the inner surface 184 of the housing 114. This creates a half-way stop feature of the bolt 106 that is utilized when closing the door from an open position, as described below.

FIGS. 21A-22B illustrate the latch assembly 110 when the bolt 106 has been moved to its fully retracted position R within the housing 114. The bolt 106 is pushed to this fully retracted position R by the force J from the strike plate or doorjamb as the bolt 106 is moved out of the strike box. The bolt 106 moves inside the housing 114 by overcoming the biasing force of the bias member 122 upon the engagement surface 125 of the bolt 106. At this point, the catch surface 186 is still engaged against the half way stop 124 to prevent rotation of the bolt 106. As illustrated in FIG. 21B, the second end 176 of the blocking cartridge 132 has moved further toward the second end 152 of the housing 114 between the extension arms 146, 166 of the locking bars 134, 136, and may even abut or be substantially close to the bar bases 142, 162 of the locking bars 134, 136. Movement of the bolt 106 to the fully retracted position R permits the bolt 106 to slide paste the doorjamb, permitting the door to be opened.

Figure 22A:
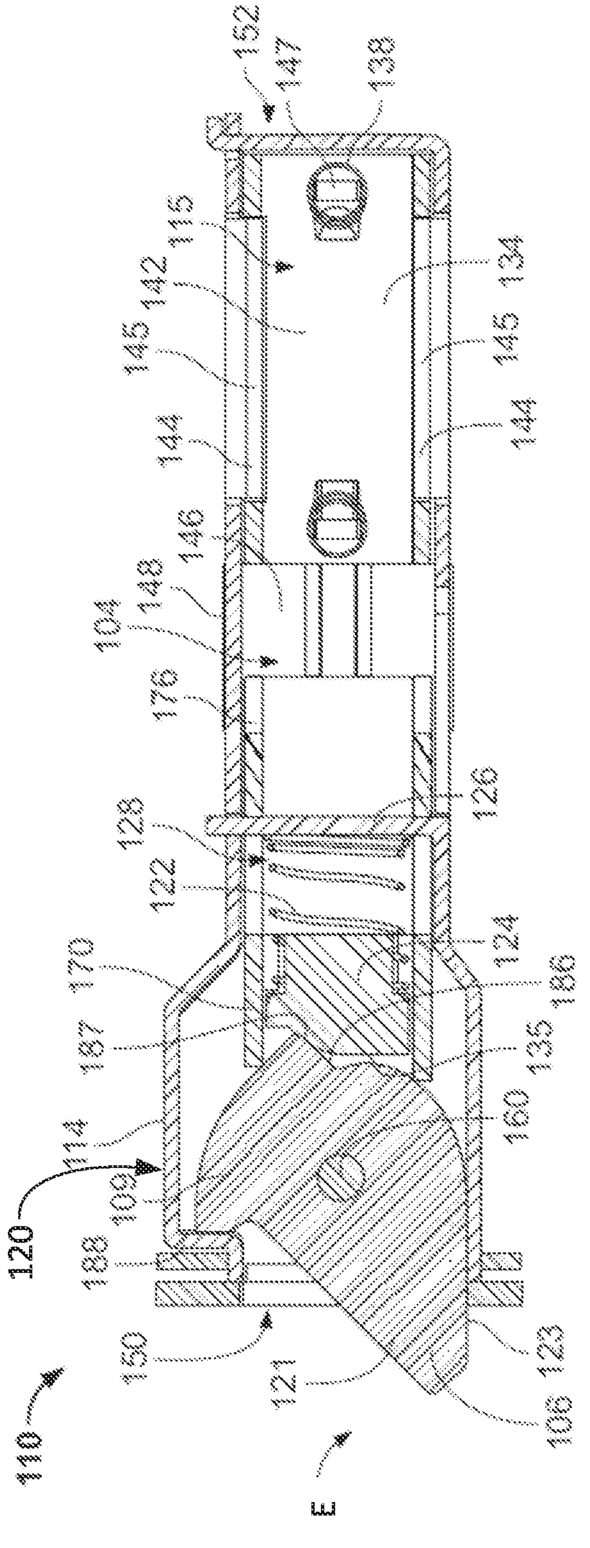
FIG. 22A is a cross-section of the latch assembly of FIG. 14 taken along line 17-17, illustrating a top down cross-sectional view of the latch assembly after the bolt has already passed the strike box when the door is in a opened position, and further illustrating the bolt is maintained in a halfway out position and is rotated inward, the bolt including an internal geometry that abuts against a halfway stop of the latch assembly to prevent the bolt from fully extending out of the latch assembly.
Figure 22B:
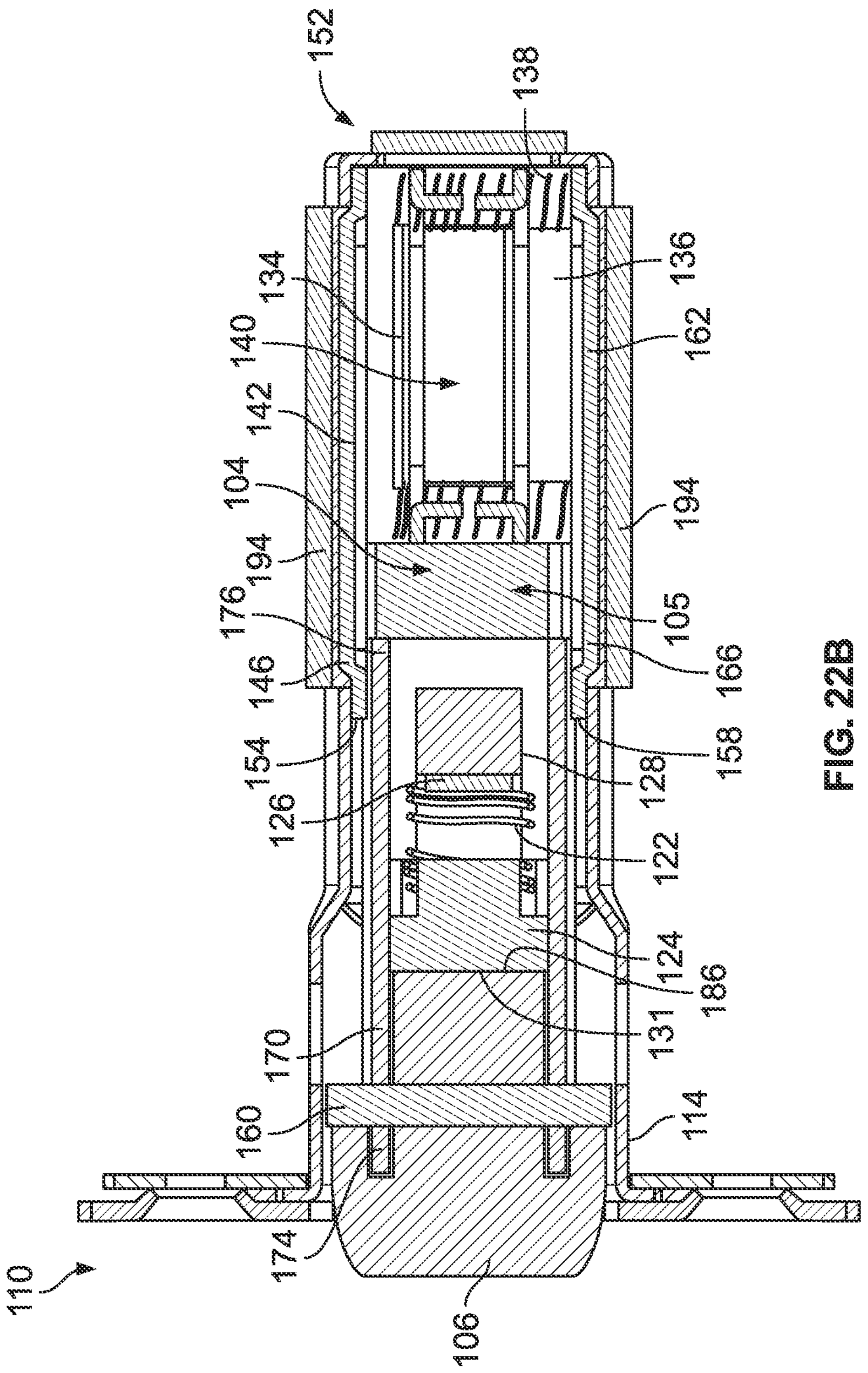
FIG. 22B is a an alternative cross-sectional view of the latch assembly of FIG. 14 and illustrating a side cross-sectional view of the latch assembly in a similar position as in FIG. 22A but at a 90 degree angle thereto.

FIGS. 22A-22B illustrate the latch assembly 110 as the door is closing from an open position but before the bolt 106 engages with the doorjamb or strike plate. After the door has been opened, the bolt 106 no longer has the jamb force J upon it. Accordingly, the bolt 106 will began to move out of the first end 150 of the housing 114 toward the extended position E because of the biasing force upon the bolt 106 from the bias member 122. However, as illustrated in FIG. 22A, the bolt 106 is prevented from returning fully to the extended position E because of the frictional engagement between the catch surface 186 and the half way stop 124. Because the bolt 106 is unable to rotate and the fin 109 of the bolt 106 cannot overcome the shoulder portion 188 of the housing 114, the bolt 106 is effectively retained at a half-way out position H. The blocking cartridge 132, which is attached to the bolt 106, has also moved further toward the first end 150 of the housing 114.

However, as illustrated in FIG. 22B, the second end 176 of the blocking cartridge 132 still remains within the space S between the extension arms 146, 166, effectively holding the extension arms 146, 166, and by extension the locking bars 134, 136, in a spaced apart configuration. This retainment further causes the spindle gap 140 to be maintained in an open or wider position, even though the spindle itself may no longer be rotated or turned by a user operating the door knob.

Figure 23A:
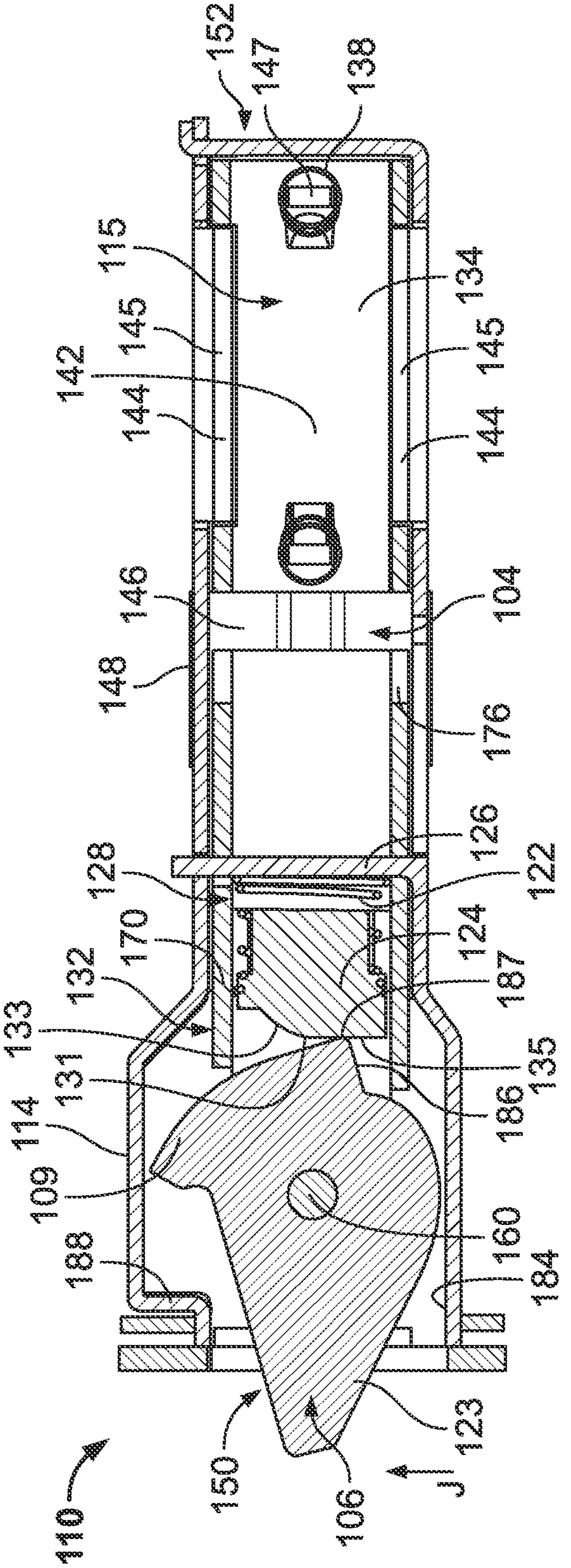
FIG. 23A is a cross-section of the latch assembly of FIG. 14 taken along line 17-17, illustrating a top down cross-sectional view of the latch assembly as the door is closing, and further illustrating that a force from the strike box upon an angled surface of the halfway out bolt causes the bolt to continue to rotate and overcome the halfway stop of the latch assembly and permit the bolt to move back toward an extended position.
Figure 23B:
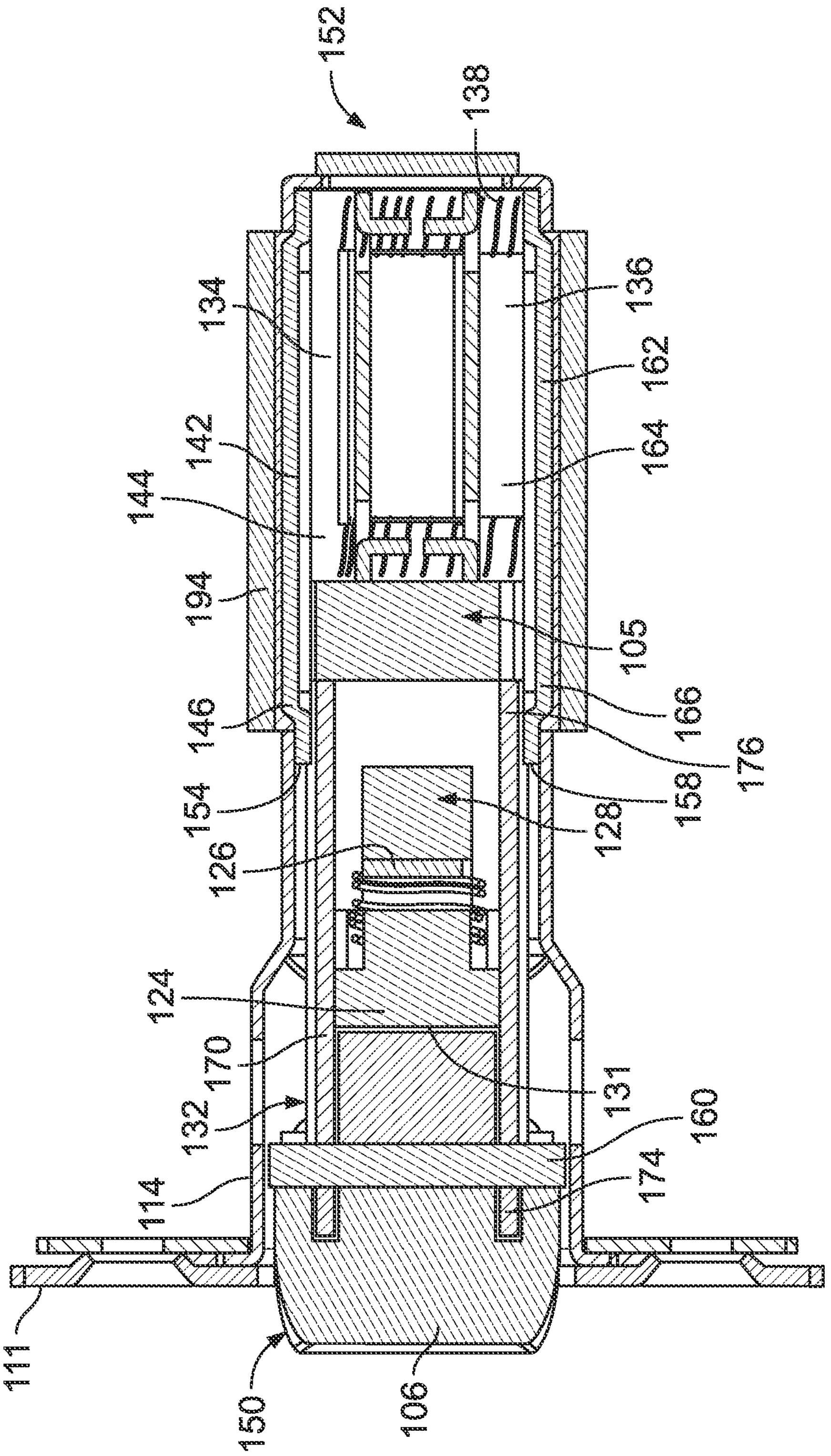
FIG. 23B is an alternative cross-sectional view of the latch assembly of FIG. 14 illustrating a side cross-sectional view of the latch assembly in a similar position as in FIG. 8A but at a 90 degree angle thereto.

FIGS. 23A-23B illustrate the latch assembly 110 as the bolt 106 engages with the doorjamb upon closing of the door. As illustrated, a force J from the doorjamb is applied to the angled surface 123 of the bolt 106 when the bolt is in the half-way out position H. The force J is enough to force the bolt 106 to rotate about the pivot pin 160 past the half-way stop 124 (and potentially apply a force against the half-way stop 124 in an opposite direction from the bias member 122 to overcome the bias force of bias member 122), overcoming the frictional engagement between the catch surface 186 and the half way stop 124. When the catch surface 186 is no longer restrained by the half way stop 124, the force J of the doorjamb coupled with the biasing force of the bias member 122 cause the bolt 106 to rotate upward in a clockwise direction C. The bolt 106 is now free to move toward the fully extended position E again in light of the biasing force of the bias member 122. The blocking cartridge 132 will move toward the first end 150 of the housing 114 as the bolt 106 does this.

Figure 24A:
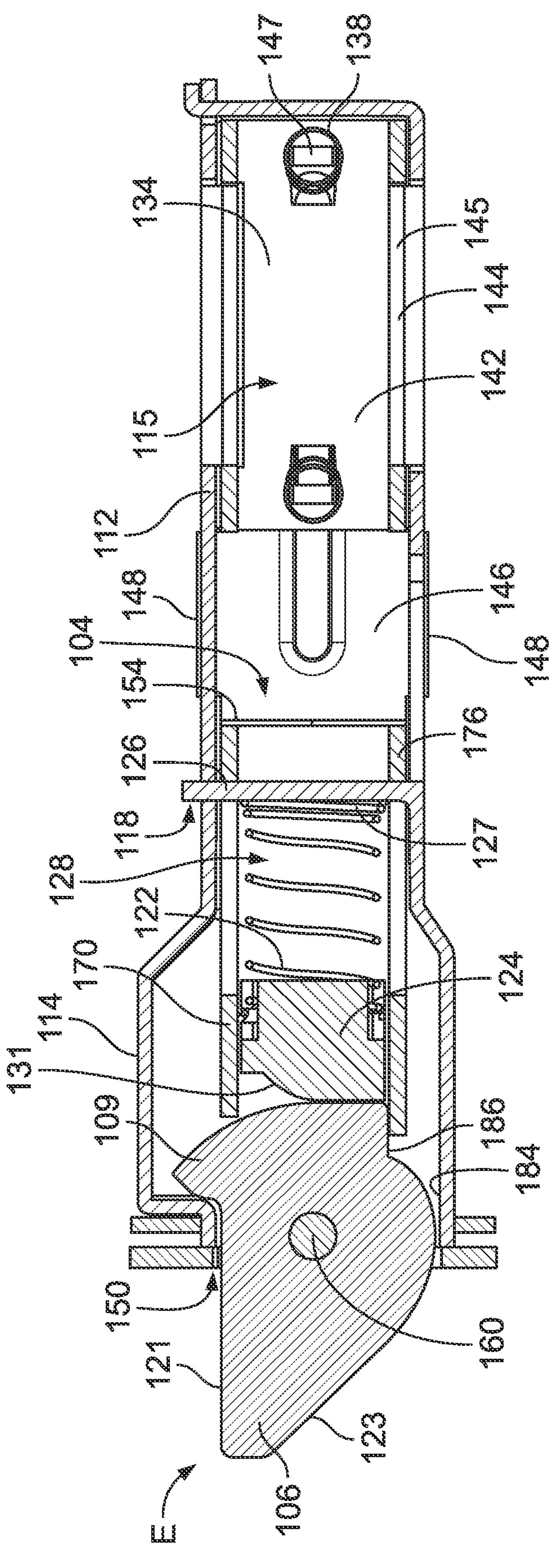
FIG. 24A is a cross-section of the latch assembly of FIG. 14 taken along line 17-17, illustrating a top down cross-sectional view of the latch assembly after the bolt has been fully extended into the strike box after the door has closed.
Figure 24B:
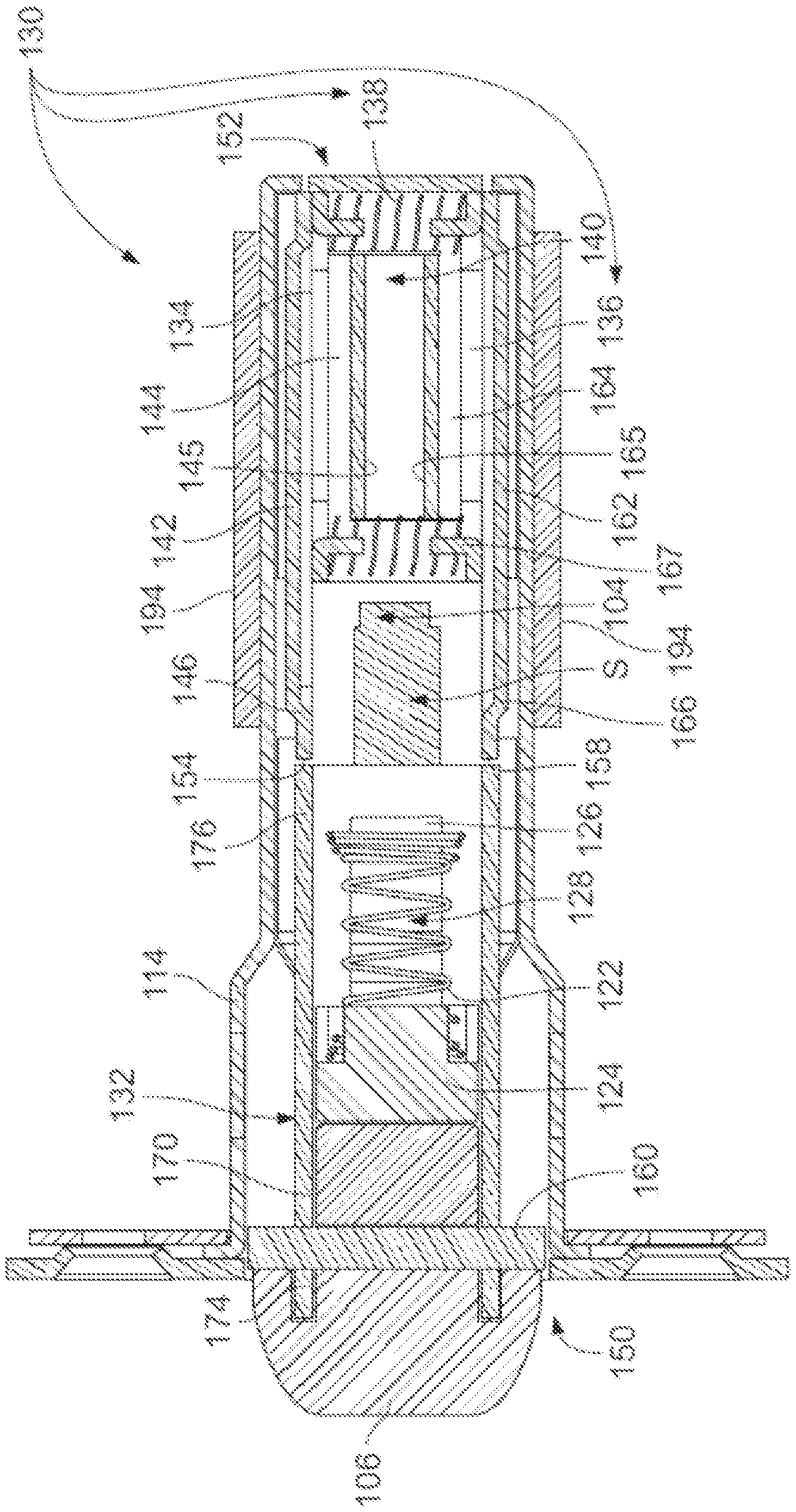
FIG. 24B is an alternative cross-sectional view of the latch assembly of FIG. 14 illustrating a side cross-sectional view of the latch assembly in a similar position as in FIG. 24A but at a 90 degree angle thereto, illustrating that the dead lock cartridge has been retracted away from the one or more locking bars of the dead locking assembly and the one or more locking bars have been biased back toward each other to cause the spindle gap to be minimized again.

FIGS. 24A-24B illustrate the latch assembly 110 after the bolt 106 has been received within a strike box of a doorjamb. Once the bolt 106 passes the doorjamb or strike plate (which would force the bolt 106 momentarily inside the housing 114 again, similar to what was described above when opening the door), the bolt 106 will no longer have a force J upon it, and will move toward the extended position E in light of the biasing force from the bias member 122. As illustrated in FIG. 24B, movement of the bolt to the extended position E will cause the blocking cartridge to return to its original position closer to the first end 150 of the housing 114.

Accordingly, the blocking cartridge 132 will slide toward the first end 150 along the longitudinal axis A within the space S until the second end 176 of the blocking cartridge 132 clears the extension arms 146, 166 of the locking bars 134, 136. When the second end 176 clears the extension arms 146, 166, there will be no additional structure keeping the extension arms 146, 166 spaced further apart from each other. The biasing members 138 of the dead locking assembly 120 will accordingly force the locking bars 134, 136, and the extension arms 146, 166 closer together. When this occurs, the second end 176 of the blocking cartridge 132 will again abut against the abutment surfaces 154, 158 of the extension arms 146, 166, effectively blocking inward movement of the blocking cartridge 132 and bolt 106.

At this point, the dead locking assembly 120 is effectively reset and cannot be disengaged until a user turns the spindle extending through the spindle gap 140 to force the locking bars 134, 136 further apart with the upward and downward forces U and D, as described herein.

In various embodiments, and as illustrated in FIGS. 16A-16B, the locking bars 134, 136 include one or more alignment fins 148, 168, respectively, that are configured to extend through one or more alignment apertures 180, 182 in the housing 114 to maintain the locking bars 134, 136 in a fixed position within the housing 114, as illustrated in FIG. 18B Specifically, the alignment fins 148, 168 may maintain the locking bars 134, 136 in a fixed position along the longitudinal axis A when the blocking cartridge 132 abuts against and applies a force upon the locking bars 134, 136 as described herein. The alignment apertures 180, 182 may be sized and shaped to permit the alignment fins 148, 168 to move within the apertures 180, 182, e.g. in a direction perpendicular to the longitudinal axis A, when the locking bars 134, 136 are moved away from each other to create a wider spindle gap 140 when the spindle is rotated. The locking bars 134, 136 may further include one or more stiffening sections 192 that provide additional rigidity to the locking bars 134, 136 to withstand forces applied to the locking bars 134, 136.

In various embodiments, and as illustrated in FIG. 18B the housing 114 of the latch assembly 110 may further include one or more positioning legs 194*a*, 194*b* that permit or assist with positioning of the housing 114 within the bore of the door or in relation to other components of the latch assembly 110 or the full latch apparatus. For instance, the positioning legs 194*a*, 194*b* may provide proper positioning of the housing 114 relative to one or more screw retainers 196, as illustrated in FIG. 19, that are configured to retain or secure other parts of the latch apparatus.

Although the present disclosure has been described with reference to particular means, materials, and embodiments, from the foregoing description, one skilled in the art can easily ascertain the essential characteristics of the invention and various changes and modifications may be made to adapt the various uses and characteristics without departing from the spirit and scope of the invention.

I claim:

1. A latch assembly comprising:

a housing defining a longitudinal axis;

a bolt moveable between at least an extended position, whereby the bolt extends at least partially out of the housing, and a retracted position, whereby an outer tip of the bolt retracts towards a face plate, wherein the bolt moves between the extended position and the retracted position by both rotating and sliding relative to the housing; and a dead locking assembly disposed within the housing and moveable between at least a locked position and an unlocked position, the dead locking assembly including:

at least one locking bar moveable in an orthogonal direction relative to the longitudinal axis between at least a blocking position and an unblocking position, wherein the at least one locking bar is biased towards the blocking position; and a blocking cartridge having a first end coupled to the bolt and an opposite second end, the blocking cartridge moveable along the longitudinal axis between at least a first position and a second position, wherein the blocking cartridge is biased towards the first position, wherein the at least one locking bar being in the blocking position engages the second end of the blocking cartridge to restrict the blocking cartridge from moving towards the second position to define the locked position that prevents the bolt from moving into the retracted position, and wherein the at least one locking bar being in the unblocking position allows the blocking cartridge to move towards the second position to define the unlocked position that allows the bolt to move towards the retracted position.

2. The latch assembly of claim 1, wherein the bolt is further movable into a half-way out position between the extended and retracted positions, and wherein when the bolt is in the half-way out position, the bolt is at least partially engaged with the housing to block the dead locking assembly from moving towards the locked position until an external force acts on the bolt.

3. The latch assembly of claim 2, wherein the half-way out position of the bolt occurs only when the bolt is moving from the retracted position towards the extended position.

4. The latch assembly of claim 2, wherein movement of the bolt from the half-way out position towards the extended position includes both a rotation and a sliding component.

5. The latch assembly of claim 2, wherein the bolt includes a fin that engages with the housing in the partially half-way out position.

6. The latch assembly of claim 1, wherein when the dead locking assembly is in the unlocked position, at least a portion of the blocking cartridge axially overlaps with the at least one locking bar relative to the longitudinal axis.

7. The latch assembly of claim 1, wherein the blocking cartridge includes a bias member that abuts the bolt.

8. The latch assembly of claim 1, wherein the blocking cartridge includes a bias member and a bolt stop, the bolt stop coupled to the bias member.

9. The latch assembly of claim 1, wherein the at least one locking bar includes one or more stiffening sections.

10. The latch assembly of claim 1, wherein the bolt includes an angled surface and a straight surface.

11. A door handle assembly comprising:
- at least one door handle;
- a torque blade coupled to the at least one door handle and rotatable therewith around a transverse axis; and
- a latch assembly coupled to the torque blade, the latch assembly including:
  - a latch housing defining a longitudinal axis, the longitudinal axis orthogonal to the transverse axis;
  - a dead locking assembly disposed within the latch housing and including:
    - at least one locking bar having a first end and a second end, the second end at least partially engaged with the torque blade so as to selectively move the at least one locking bar in a direction orthogonal to the longitudinal axis upon rotation of the torque blade; and
    - a blocking cartridge having a housing with a first end and a second end slidable along the longitudinal axis relative to the at least one locking bar, the second end of the housing selectively engageable with the first end of the at least one locking bar so as to prevent sliding movement of the blocking cartridge; and
  - a bolt pivotably coupled to the first end of the housing and slidable therewith, wherein the bolt is moveable between an extended position and a retracted position by both rotating and sliding relative to the latch housing, and wherein when the second end of the housing is engaged with the first end of the at least one locking bar, the bolt is prevented from moving out of the extended position.

12. The door handle assembly of claim 11, wherein the direction that the at least one locking bar moves is orthogonal to the transverse axis.

13. The door handle assembly of claim 11, wherein the at least one locking bar includes a first locking bar and a second locking bar oppositely biased.

14. The door handle assembly of claim 11, wherein the first end of the at least one locking bar is engaged with the latch housing.

15. The door handle assembly of claim 11, wherein the torque blade has a rectangular cross-section.

16. The door handle assembly of claim 11, wherein the blocking cartridge includes a bias member disposed between the bolt and a bias stop, the bias stop fixed with respect to the latch housing.

17. The door handle assembly of claim 16, wherein the blocking cartridge further comprises a bolt stop configured to engage the bolt.

18. The door handle assembly of claim 17, wherein the bolt stop is coupled to the bias member.

19. The door handle assembly of claim 17, wherein the bolt stop is coupled to the housing of the blocking cartridge.

20. The door handle assembly of claim 11, wherein the door handle comprises one of a door knob or a door lever.

21. A door handle assembly comprising:
- at least one door handle;
- a torque blade coupled to the at least one door handle and rotatable therewith around a transverse axis; and
- a latch assembly coupled to the torque blade, the latch assembly including:
  - a latch housing defining a longitudinal axis, the longitudinal axis orthogonal to the transverse axis;
  - a dead locking assembly disposed within the latch housing and including:
    - at least one locking bar having a first end and a second end, the second end at least partially engaged with the torque blade so as to selectively move the at least one locking bar in a direction orthogonal to the longitudinal axis upon rotation of the torque blade; and
    - a blocking cartridge having a housing with a first end and a second end slidable along the longitudinal axis relative to the at least one locking bar, the second end of the housing selectively engageable with the first end of the at least one locking bar so as to prevent sliding movement of the blocking cartridge; and
  - a bolt pivotably coupled to the first end of the housing and slidable therewith,
- wherein the at least one locking bar includes a first locking bar and a second locking bar oppositely biased.

* * * * *